(12) United States Patent
Bleasdale-Shepherd

(10) Patent No.: US 10,888,778 B2
(45) Date of Patent: Jan. 12, 2021

(54) AUGMENTED REALITY (AR) SYSTEM FOR PROVIDING AR IN VIDEO GAMES

(71) Applicant: Valve Corporation, Bellevue, WA (US)

(72) Inventor: Iestyn Bleasdale-Shepherd, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/738,811

(22) Filed: Jan. 9, 2020

(65) Prior Publication Data
US 2020/0147486 A1 May 14, 2020

Related U.S. Application Data

(63) Continuation of application No. 16/143,192, filed on Sep. 26, 2018, now Pat. No. 10,569,164.

(51) Int. Cl.
A63F 13/26 (2014.01)
A63F 13/86 (2014.01)
A63F 13/35 (2014.01)

(52) U.S. Cl.
CPC .............. A63F 13/26 (2014.09); A63F 13/35 (2014.09); A63F 13/86 (2014.09); A63F 2300/8082 (2013.01)

(58) Field of Classification Search
None
See application file for complete search history.

(56) References Cited

U.S. PATENT DOCUMENTS

| 9,881,420 | B2 | 1/2018 | Miller |
| 10,390,165 | B2 | 8/2019 | Roach et al. |
| 2013/0281206 | A1 | 10/2013 | Lyons et al. |
| 2014/0168262 | A1* | 6/2014 | Forutanpour ......... G06T 19/006 345/633 |
| 2016/0104452 | A1 | 4/2016 | Guan et al. |
| 2018/0005440 | A1* | 1/2018 | Mullins ................... G06F 9/44 |
| 2018/0197336 | A1 | 7/2018 | Rochford et al. |

(Continued)

OTHER PUBLICATIONS

The PCT Search Report and Written Opinion dated Oct. 25, 2019 for PCT Application No. PCT/US2019/053009, 6 pages.

Primary Examiner — Ronald Laneau
(74) Attorney, Agent, or Firm — Lee & Hayes, P.C.

(57) ABSTRACT

An augmented reality (AR) system allows for providing AR in video games. The disclosed AR system allows for layering AR content on top of the built-in features of video games to provide a unique "in-game" AR experience for gamers. A remote computing system provides a central data warehouse for AR content and related data that may be accessed by select client machines to render augmented frames with AR content during execution of video games. The AR content may be spatially-relevant AR content that is rendered at appropriate locations within a game world. The AR content may be event specific such that the AR content is added in response to game-related events. The disclosed AR system allows for adding multiplayer aspects to otherwise single player games, and/or sharing of AR content in real-time to provide augmentative features such as spectating, mixing of game worlds, and/or teleportation through AR objects.

20 Claims, 12 Drawing Sheets

(56) References Cited

U.S. PATENT DOCUMENTS

2019/0094981 A1    3/2019  Bradski et al.
2019/0371073 A1*  12/2019  Harviainen ............. G06T 19/20
2020/0066044 A1*   2/2020  Stahl ...................... G06Q 50/01

* cited by examiner

AUGMENTED REALITY (AR) SYSTEM FOR PROVIDING AR IN VIDEO GAMES

CROSS REFERENCE TO RELATED APPLICATION

This U.S. patent application is a continuation of and claims priority to co-pending and commonly assigned U.S. patent application Ser. No. 16/143,192, entitled "AUGMENTED REALITY (AR) SYSTEM FOR PROVIDING AR IN VIDEO GAMES," and filed on Sep. 26, 2018, the entirety of which is incorporated herein by reference.

BACKGROUND

Augmented Reality (AR) technology traditionally involves augmenting a real-world environment with computer-generated content that is displayed on a see-through display. In this way, a user of such an AR device is able to see the computer-generated content in the context of real objects that reside in their real-world environment. So far, AR technology has been predominantly confined to augmenting the real world. The disclosure made herein is presented with respect to these and other considerations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
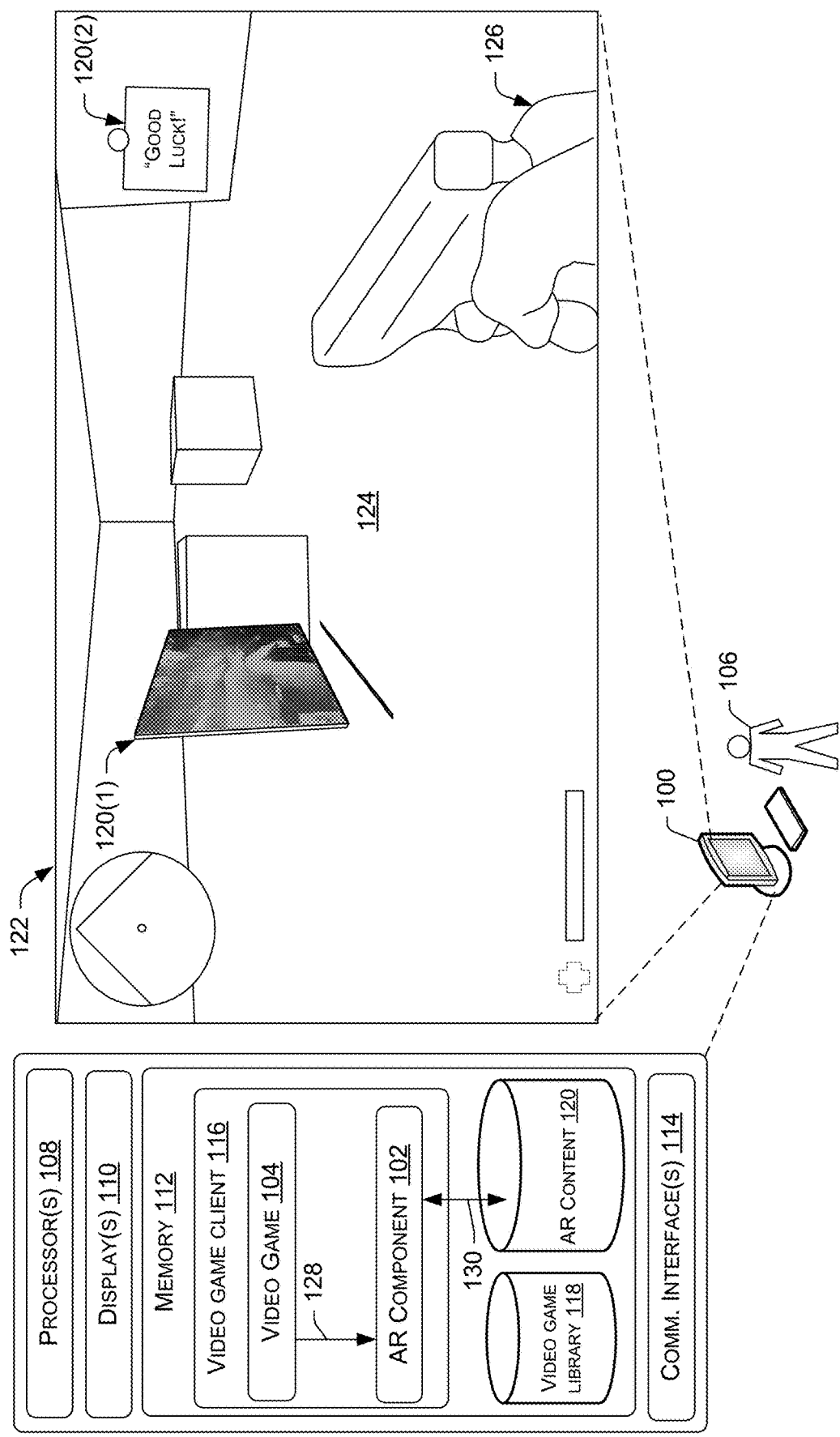
FIG. 1 shows a block diagram illustrating example components of a client machine having an augmented reality (AR) component configured to render augmented frames during execution of a video game, the augmented frames including video game content and augmented reality (AR) content.

Described herein are, among other things, techniques, devices, and systems for providing augmented reality (AR) in video games. As mentioned, AR is traditionally regarded as a technology that is usable to enhance a user's experience with the real world (i.e., the physical environment of the user). The AR system disclosed herein enhances a user's experience, not with the real world, but with a game world of a video game. The disclosed AR system allows for layering AR content on top of the built-in features of video games. This in-game AR system is universal in the sense that it allows authors to provide a unique "in-game" AR experience for gamers by creating AR content for any video game, or multiple video games. In so doing, the disclosed AR system alleviates the burden on game developers to provide the same type of augmentative features to their own games. If left to their own devices, game developers would likely end up custom-building their own AR systems, which would likely result in AR systems that are game-specific and incompatible with other games released by other game developers. The disclosed in-game AR system is, by contrast, compatible with multiple different video games.

The disclosed in-game AR system may include, among other things, a remote computing system that acts as a central data warehouse for AR content and related data. In some embodiments, the remote computing system maintains AR content in a spatial database that associates the AR content with various data (e.g., a game identifier (ID), spatial data relating to game world coordinates of a video game, event data specifying game-related events, etc.). Additionally, or alternatively, the AR content may be associated AR channels that act as filtering criteria for the AR content.

The remote computing system may further provide an interface for authors to create new AR content, which is thereafter maintained by the remote computing system and made accessible to a select audience of gamers who would like to augment their video games with in-game AR experiences. This content-creation interface may support the creation of different types of AR content including, without limitation, informational messages, two-dimensional (2D) objects, three-dimensional (3D) objects, screen shots with 2D and/or 3D pixel data, video clips, and the like. AR content can be "static," and therefore rendered at a fixed location within a game world. AR content can be "dynamic," and therefore moving or animating within the game world. In some embodiments, AR content can even be interactive through the use of plugins that allow authors to create executable programs that respond to real-time video game data as input to the programs. In this manner, a player of the video game can not only experience AR content that has been added to a game world, but may, in some cases, interact with AR content, much like playing a secondary video game within the game world of the core video game.

In order to render the AR content within a game world, a client machine may obtain access to AR content, and may identify and render relevant AR content within a game world, as appropriate, while a video game is executing on the client machine. The client machine may access the AR content from any suitable storage location (e.g., from a remote computing system over a computer network, from local memory after downloading the AR content from the remote computing system). In an example process, a client machine may execute a video game that is configured to output video game content in a series of frames. During game execution, the client machine may augment any given frame of the series of frames with AR content by: (i) obtaining, from the video game, video game data about a current state of the video game, (ii) identifying AR content based at least in part on the video game data, (iii) generating an augmented frame that includes both the video game content and the identified AR content, and (iv) rendering the augmented frame on a display associated with the client machine. Notably, the AR content is not generated by the video game executing on the client machine, but is retrieved from a separate resource that maintains the AR content for retrieval in rendering augmented frames by layering the AR content "on top of" the video game content. Although it is often stated herein that AR content is layered "on top of" the video game content, this is not to be taken literally, as the AR content can be merged with video game content in any suitable manner such that some video game content (e.g., translucent graphics) is rendered "on top of" the AR content.

In some embodiments, the video game data—which is obtained from the executing video game and used to identify relevant AR content for augmenting a frame—may be spatial data that relates to game world coordinates within the game world of the video game. For example, the AR content may be identified based on its association with coordinates in the game world that relate, in some way, to a current location of a player-controlled character. In this manner, spatially-relevant AR content can be rendered with video game content in an augmented frame at a location within the game world of the video game. In some embodiments, the video game data can also be event data that relates to game-related events. For example, the AR content may be identified and rendered within the game world based on the occurrence of a game-related event (e.g., a shot fired from a gun, a game character entering/exiting a vehicle, etc.).

The disclosed AR system also allows for augmenting a single-player video game with various multiplayer aspects. This may be accomplished without having to overhaul the code for the single-player game in order to make it a multiplayer game. To enable such multiplayer aspects, client machines may exchange data over a computer network. For example, a first client machine executing a video game may be connected to a remote computing system so that the first client machine can receive, via the remote computing system, data emitted by a second client machine that is also executing the video game. The data emitted by the video game executing on the second client machine may be spatial data that specifies a current location of a second player-controlled character within a second instance of the game world that is being rendered on the second client machine. Upon receiving this spatial data over the network, the first client machine can identify and retrieve AR content (e.g., an AR avatar of the second player-controlled character), and the first client machine may render the retrieved AR content within the first instance of the game world that is being rendered on the first client machine, the AR content being rendered at a location within the game world that corresponds to the received spatial data. By way of example, this technique may allow for adding "speed running" to an otherwise single player game, whereby a first player using the first client machine sees an AR avatar of the second player's game character that is overlaid onto the video game content of the first player's video game.

In some embodiments, the disclosed AR system may construct (or reconstruct) a model of a portion of a game world from a 3D screenshot (i.e., an image with depth data). In this case, AR content may be a 3D screenshot, and a 3D model of a portion of a game world captured in the 3D screen shot can be constructed to allow a first gamer to look around and/or move around a "slice" of a game world that was captured by a second gamer. This 3D slice of the game world can be rendered in an augmented frame 122 on the first gamer's client machine while playing a video game.

In some embodiments, the disclosed in-game AR system may allow for real-time sharing of AR content over a computer network between client machines of different gamers. For instance, AR content can be rendered in a first video game as a viewport, or even as a portal, into the game world of another player's video game. This technique may use 3D screenshots to construct a 3D model of a portion of the game world exhibited in a particular 3D screenshot. This allows gamers to interact with each other through AR content that is rendered in each video game as a window into the other video game's virtual game world.

The techniques and systems described herein may allow one or more devices to conserve resources with respect to processing resources, memory resources, and/or networking resources. For example, sending data, in lieu of actual content (e.g., images and/or video files) over a computer network reduces network bandwidth consumption, at least as compared to live game streaming technology in use today that send a stream of content over a computer network at a high bandwidth consumption. As another example, selective download of AR content to client machines may reduce network bandwidth consumption and/or memory consumption by, and/or on, a local client machine that is configured to retrieve and render AR content during video game execution. Other examples are described throughout this disclosure.

FIG. 1 shows a block diagram illustrating example components of a client machine 100 having an augmented reality (AR) component 102 configured to render augmented frames during execution of a video game 104, the augmented frames including video game content and AR content. In general, the client machine 100 shown in FIG. 1 may represent a computing device that can be utilized by a user 106 to execute programs and other software thereon. The user 106 of the client machine 100, as shown in FIG. 1, is often referred to herein as a "player" in the context of the user 106 using the client machine 100 for the specific purpose of playing a video game 104 that is executing on the client machine 100, or that is executing on a remote computing system and playable on the client machine 100 as a streamed video game 104. Accordingly, the terms "user 106," "player 106," and/or "gamer 106" may be used interchangeably herein to denote a user of the client machine 100, wherein one of many uses of the client machine is to play video games.

The client machine 100 can be implemented as any suitable type of computing device configured to process and render graphics on an associated display, including, without limitation, a PC, a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, and/or any similar computing device.

In the illustrated implementation, the client machine 100 includes, among other components, one or more processors 108—such as a central processing unit(s) (CPU(s)) and a graphics processing unit(s) (GPU(s)), a display(s) 110, memory 112 (or non-transitory computer-readable media 112), and a communications interface(s) 114. Although the example client machine 100 of FIG. 1 suggests that the client machine 100 includes an embedded display 110, the client machine 100 may in fact omit a display, but may, instead, be coupled to a peripheral display. Thus, the display 110 is meant to represent an associated display 110, whether embedded in the client machine 100, or connected thereto (through wired or wireless protocols).

The memory 112 (or non-transitory computer-readable media 112) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 112 may be implemented as computer-readable storage media ("CRSM"), which may be any available physical media accessible by the processor(s) 108 to execute instructions stored on the memory 112. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 108.

As will be described in more detail below, the client machine 100 may communicate with a remote computing system over a computer network via the communications interface(s) 114. As such, the communications interface(s) 114 may employ any suitable communications protocol for communicating over a wired infrastructure (e.g., coaxial cable, fiber optic cable, etc.), a wireless infrastructure (e.g., radio frequencies (RF), cellular, satellite, etc.), and/or other connection technologies.

Figure 2:
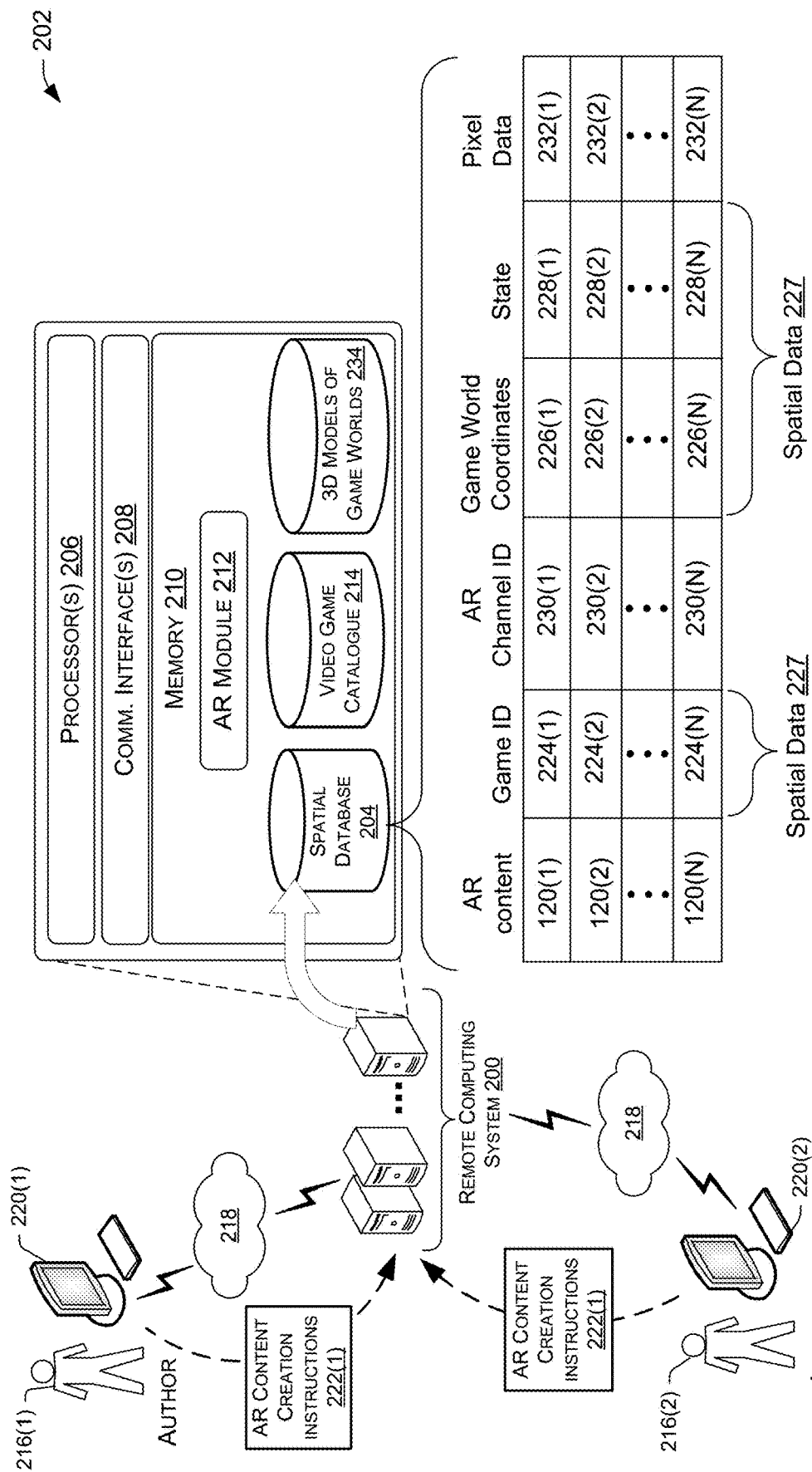
FIG. 2 is a diagram illustrating an example system, including components of a remote computing system, for creating and maintaining AR content in a spatial database so that it is selectively provisioned to client machines for use in video games.

In some embodiments, a remote computing system, such as the remote computing system 200 shown in FIG. 2, acts as, or has access to, a platform to distribute (e.g., download) programs (and content) to client machines, such as the client machine 100. Accordingly, the client machine 100 is shown in FIG. 1 as having a video game client 116 installed in the memory 112. The video game client 116 may represent an executable client application that is configured to launch and execute programs, such as video games (or video game programs). In other words, the video game client 116 may include gaming software that is usable to play video games on the client machine 100. With the video game client 116 installed, a client machine 100 may then have the ability to receive (e.g., download, stream, etc.) video games from a remote system over a computer network, and execute the video games via the video game client 116. Any type of content-distribution model can be utilized for this purpose, such as a direct purchase model where video games are individually purchasable for download and execution on a client machine 100, a subscription-based model, a content-distribution model where video games are rented or leased for a period of time, and so on. Accordingly, the client machine 100 may include one or more video games, such as the video game 104, within a video game library 118. These video games may be retrieved and executed by loading the video game client 116. In an example, a user may choose to play one of multiple video games they have purchased and downloaded to the video game library 118 by loading the video game client 116 and selecting a video game 104 to start execution of the video game 104. The video game client 116 may allow users 106 to login to a video game service using credentials (e.g., a user account, password, etc.).

A remote computing system, such as the remote computing system 200 of FIG. 2, may further act as, or have access to, a platform to distribute (e.g., stream, download, etc.) augmented reality (AR) content 120 to client machines, such as the client machine 100. Accordingly, the client machine 100 is shown as having AR content 120 stored in the local memory 112 so that the AR content 120 is accessible from local memory 112. In general, this AR content 120 may be received (e.g., downloaded, streamed, etc.) from the remote system 200 over a computer network, and may be used in the process of rendering augmented frames that include the AR content 120 added to the video game content that is output by the video game 104 itself. As such, the AR content 120 may be maintained remotely (e.g., at the remote computing system 200) and accessed over a computer network. FIG. 1 illustrates an example augmented frame 122, which may be rendered as one of multiple frames during execution of the video game 104. As used herein, a "frame" means an image frame that is one of many image frames in a series of image frames to render a live video game on a display. Accordingly, an augmented frame 122 is a composite frame that includes both video game content 124 and AR content 120. Notably, the AR content 120 represents content that is not generated by the video game 104 itself. Thus, the AR content 120 represents supplemental computer-generated graphics that are added to the video game content after-the-fact. Accordingly, the video game content 124 in FIG. 1 represents video game content for one of a series of frames output by the video game 104 itself while executing on the client machine 100. In this sense, a "game world" of the video game 104 may be defined by a coordinate system, and the portion of the game world that is rendered in each frame of the series of frames may depend on various factors, including the current location of a player-controlled character 126 within the game world. The coordinate system of the game world may define coordinates that correspond to locations within the game world. FIG. 1 shows an example of a first-person shooter video game 104 that allows the player 106 to control the game character's 126 movements within the game world. For instance, the player 106 can provide user input to the client machine 100 (e.g., via a game controller, a touchscreen, etc.) to move the player-controlled character 126 from one location to another location, wherein each location is specified in terms of specific coordinates that indicate where the player-controlled character 126 is located within the game world at any given moment.

As will be described in more detail below, the AR content 120 that is accessible to the client machine 100 may be stored in association with spatial data, which may specify particular coordinates of a game world of a particular video game 104. In this manner, whenever the video game 104 renders a portion of the game world that includes coordinates associated with particular AR content 120, the AR content 120 may be identified based on its association with those coordinates, and the identified AR content 120 may be used to generate an augmented frame 122 that includes the AR content 120 presented at a location within the game world that corresponds to those coordinates.

To illustrate how the client machine 100 may operate to provide in-game AR, consider a frame, of a series of frames, that is to be rendered on the display(s) 110 associated with the client machine 100. To render the given frame, the AR component 102 executing on the client machine 100 may obtain, from the video game 104, video game data 128 about a current state of the video game 104, identify AR content 120 based at least in part on the video game data 128 (as shown by the arrow 130 in FIG. 1 to access the AR content 120, locally or remotely), generate an augmented frame 122 that includes video game content 124 output by the video game 104 and the AR content 120 that was identified based on the video game data 128, and render the augmented frame 122 on the display(s) 110.

The AR component 102 may be executed separately from the execution of the video game 104 so that, in the event that the video game 104 crashes, the AR component 102 does not crash, and vice versa. In this sense, the AR component 102 is decoupled from any particular video game 104 that is executing on the client machine 100, which provides an ability to have an AR system including the AR component 102 that is compatible with, and transferrable across, multiple video games so that AR content 120 can be added to any video game 104 to enhance the user experience. For example, the AR component 102 may be run as a separate process from the video game 104 (e.g., a separate .exe to that of the video game 104), and the AR component 102 and the video game 104 may communicate back and forth. The AR process can potentially communicate with multiple video games and/or multiple non-game applications at once. This AR process can also include, or be configured to load, plugins. These plugins may be executed within a security sandbox (or container). This decoupling of the AR component 102 from the video game 104 provides stability; the video game 104 will not crash the AR process and vice versa. Security is another benefit, because third party plugin code for rendering AR content 102 will not run in the same process as the video game 104 because it is sandboxed and kept separate, thereby mitigating any potential for cheating with the AR system. In some embodiments, a video game in the form of an "AR Viewer", described in more detail below, may allow users 106 to spectate on AR content 120 out of context of video game content 124. For example, an "AR Viewer" can access and render AR content 120 on a blank background or a 3D model representation of a game world.

In the example of FIG. 1, the AR content 120 that was identified based on the video game data 128 includes first AR content 120(1) and second AR content 120(2). The first AR content 120(1) is, by way of example, a screenshot (e.g., a 2D or a 3D image), and the second AR content 120(2) is, by way of example, an informational message. The first AR content 120(1) may be associated with first coordinates within the game world, and the second AR content 120(2) may be associated with second coordinates within the game world. In this scenario, the video game data 128 obtained from the video game 104 may include spatial data that specifies a current location of the player-controlled character 126 within the game world, and possibly other spatial data, such as a current orientation of a virtual camera associated with the player-controlled character 126. The camera orientation data may indicate the field of view as seen from the perspective of the player-controlled character 126, and thus, when coupled with the current location of the player-controlled character 126, a set of coordinates corresponding to a portion of the game world that is within the field of view of the player-controlled character 126 can be determined. In this manner, the AR content 120 that is to be rendered in the augmented frame 122 can be identified based at least in part on the spatial data that specifies the current location of the player-controlled character 126, and possibly based on additional spatial data, such as camera orientation data, an index, and the like. These aspects of spatial data will be described in more detail below.

Thus, the AR component 102 may determine that the screenshot (the first AR content 120(1)) is to be rendered at first coordinates that correspond to a first location within the game world, and that the informational message (the second AR content 120(2)) is to be rendered at second coordinates that correspond to a second location within the game world. In this manner, the AR content 120 may be "spatially-relevant" AR content 120 in the sense that it is associated with particular coordinates within the game world. The player 106 can therefore navigate the player-controlled character 126 around the AR content 120, which may, in some cases, remain fixed at a location within the game world.

As mentioned, the AR content 120 may additionally, or alternatively, be event-related AR content 120 in the sense that it is associated with particular events, as they occur in the video game 104. In this scenario, the first AR content 120(1) may be associated with a first game-related event, and the second AR content 120(2) may be associated with the first game-related event or a second game related event, and the video game data 128 obtained from the video game 104 may include event data that indicates the occurrence of the game-related event(s).

In some embodiments, the AR component 102 may receive the video game data 128 from the video game 104 as part of a function call made by the video game 104. In this scenario, a game developer of the video game 104 may implement an application programming interface (API) in the video game code to provide a rendering hook that makes this type of function call to the AR component 102 during individual frame loops during game execution to pass video game data 128 to the AR component 102. For instance, a code library written by a service provider of the video game platform may be provided to a game developer for integration into their video game 104, which allows for providing an AR-related process runs within the game process, and which is responsible for communicating with an external AR component 102 that runs in a separate process. The AR component 102 may be responsible for rendering an augmented frame 122 based on the video game data 128 and for requesting the AR content 120 that is to be rendered in the augmented frame 122. In some embodiments, the timing of the function call during a frame loop is such that the function call is made after rendering opaque graphics in the video game content 124, but before rendering translucent graphics in the video game content 124 so that the AR content 120 can be rendered between the two types of graphics. In some embodiments depth data from a depth buffer is used to merge video game content 124 and AR content 120 appropriately. The function call may provide the video game data 128 (e.g., spatial data, such as game world coordinates, a matrix transform of the camera orientation of the player-controlled character 126, event data, etc.) to the AR component 102 so that the AR component 102 can retrieve relevant AR content 120 based on the video game data 128.

In some embodiments, AR content 120 can be automatically "injected" into the video game by the AR component 102 as an overlay on an existing frame of video game content 124, which does not rely on coordinating with the game developer to implement any additional AR-related code into their video game. This automatic injection technique may be accomplished using Simultaneous Localization and Mapping (SLAM) technology, as will be described in more detail below. In short, a SLAM process may be performed offline by the remote computing system 200 shown in FIG. 2, and may be used to reconstruct game world geometry (e.g., 3D models of game worlds) incrementally from many images. This backend process may be done by a service provider of the video game platform, by game developers, and/or by crowd-sourcing game world images from player client machines 100. In this manner, SLAM can be used to automate the recognition of game world geometry depicted in a screenshot of video game content 124, and the 3D models of the game world that are generated by the SLAM process can be used by client machines 100 to augment video game content 124 with AR content 120 in a way that presents the AR content 120 in the context of the game world geometry. This may also allow for adding AR content 120 to the video game content 124 of back catalogue games whose code is no longer updated by a game developer. In some embodiments, the video game 106 may be configured to explicitly request AR content 120 itself and render the AR content 120 itself, without reliance on the AR component 102.

In some embodiments, the AR content 120 is overlaid on the video game content 124 in the process of rendering the augmented frame 122. For example, the video game 104 may output pixel data (e.g., color values, depth values, etc.) that correspond to the graphics that are to be rendered on the display(s) 110 for the augmented frame 122. The pixel data that is output by the video game 104 may indicate, for example, that opaque graphics are to be rendered first (e.g., at a greater depth value farther from the current location of the player-controlled character 126), and that translucent graphics (e.g., particles, clouds, dust, etc.) are to be rendered after the opaque graphics (e.g., at a lesser depth value closer to the current location of the player-controlled character 126). Accordingly, the AR content 120 may, in some cases, be rendered between opaque graphics and translucent graphics, such as by rendering the AR content 120 at a depth value between the depth values for the opaque and translucent graphics, respectively.

In some embodiments, the AR content 120 can be presented in a subtle manner within the augmented frame 122, such as with an icon that does not take up much space in the game world, and when the user 106 focuses on the AR content 120 (e.g., by hovering a pointer over the icon, moving close to the icon, etc.) the pop-up may be presented asking the user 106 if he/she would like to see more. If the user 106 indicates, via a selection of a button, that he/she would like to see more, then the full version of the AR content 120 may be presented (e.g., by expanding the icon into a screenshot, an informational message, an object, or any other form of AR content 120). In some embodiments, unsubscribed AR content 120 can be presented in this manner. AR channels are discussed in more detail below (e.g., See FIG. 3). In short, AR channels act as a filtering mechanism so that a user 106 can subscribe to one or more AR channels to see AR content that is relevant to those subscribed AR channels. However, in addition to receiving subscribed AR content from subscribed AR channels, a client machine 100 may receive AR content 120 to which the user 106 has not yet subscribed, and which is presented in a subtle manner within an augmented frame 122 to visually distinguish the unsubscribed AR content 120 from the subscribed AR content 120. This unsubscribed AR content 120 may be transmitted to the client machine 100 based on current game world coordinates of a to-be-rendered portion of a game world of a video game 104. Thus, the unsubscribed AR content 120 may be offered to the user 106 for subscription based on the location within the game world that the user 106 is currently experiencing.

FIG. 2 is a diagram illustrating an example system 202, including components of a remote computing system 200, for creating and maintaining AR content 120 and related data in a spatial database 204 so that the AR content 120 is selectively provisioned to client machines for use in video games. In the illustrated implementation, the remote computing system 200 includes, among other components, one or more processors 206, a communications interface(s) 208, and memory 210 (or non-transitory computer-readable media 210). The memory 210 (or non-transitory computer-readable media 210) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 210 may be implemented as computer-readable storage media ("CRSM"), which may be any available physical media accessible by the processor(s) 206 to execute instructions stored on the memory 210. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 206. An augmented reality (AR) module 212 may represent instructions stored in the memory 210 that, when executed by the processor(s) 206, cause the remote computing system 200 to perform the techniques and operations described herein. The memory 210 is also shown as maintaining a video game catalogue 214, which may store a catalogue of video games, such as the video game 104, for distribution to client machines, such as the client machine 100, as described herein.

The communications interface(s) 208 may employ any suitable communications protocol for communicating over a wired infrastructure (e.g., coaxial cable, fiber optic cable, etc.), a wireless infrastructure (e.g., radio frequencies (RF), cellular, satellite, etc.), and/or other connection technologies. Authors, such as the authors 216(1) and 216(2) shown in FIG. 2, may access the remote computing system 200 over a computer network 218 using respective user computing devices 220(1) and 220(2). The computer network 218 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. The remote computing system 200 may, in some instances be part of a network-accessible computing platform that is maintained and accessible via the computer network 218. Network-accessible computing platforms such as this may be referred to using terms such as "on-demand computing", "software as a service (SaaS)", "platform computing", "network-accessible platform", "cloud services", "data centers", and so forth. In general, the remote computing system 200 is configured to act as a central data warehouse for AR content 120 and related data.

The remote computing system 200 may be further configured to provide an interface (e.g., an application programming interface (API)) for user computing devices 120 to create new AR content 120. As such, the remote computing system 200 may receive, via a content-creation interface (e.g., API) and from user computing devices 120, instructions 222 to create AR content 120. FIG. 2 depicts a first author 216(1) using a first user computing device 220(1) to provide first instructions 222(1) to create new AR content 120, and a second author 216(2) using a second user computing device 220(2) to provide second instructions 222(2) to create new AR content 120. It is to be appreciated that the remote computing system 220 can support a community of such authors 216 who would like to create new AR content 120 so that it is maintained by the remote computing system 200 for access by client machines while playing video games.

In addition to an API that allows authors 216 to create AR content 120 outside of the execution of a video game 104, new AR content 120 can be created on a client machine 100 during execution of a video game 104 via plugin logic. For example, the AR component 102 executing on a client machine 100 may provide video game data 128 to a plug-in(s) that creates new AR content 120 (e.g., post-it notes, screenshots, etc.) during gameplay. This plugin-created AR content 120 may be transient in the sense that it exists for the lifetime of the current player's 106 game session and is not persisted after the session ends. Alternatively, the plugin-created AR content 120 may be uploaded to the spatial database 204 so that it is accessible in a later game session. In some embodiments, plugin-created AR content 120 is shared in real-time with other players 106 who are playing the same video game 104 or a different video game. In this scenario, the remote computing system 200 functions as a server that relays AR content 120 between client machines 100 during game sessions. Authors 216 may also use the content-creation API to specify access rights associated with new AR content, and/or content previously created by the author 216. The content-creation API can also allow for adding AR content to pre-existing screenshots or video clips associated with one or more video games 104.

FIG. 2 shows a spatial database 204 that is used to store the AR content 120 created by authors 216. The spatial database 204 may associate the AR content 120 with various types of data, including, without limitation, the types of data shown in FIG. 2. For example, FIG. 2 illustrates how the spatial database 204 may include multiple records of AR content 120(1), 120(2), . . . , 120(N). Each record of AR content 120 may, for example, be associated with a game identifier (ID) 224, which uniquely identifies a video game 104 within the video game catalogue 214. In this manner, each record of AR content 120 can be tied to a particular video game. In some embodiments, an individual record of AR content 120 can be associated with multiple game IDs 224 of multiple different video games, or the spatial database 204 can maintain separate records to associate the same AR content 120 with multiple different game IDs 224 of different video games. In some embodiments, the game ID 224 may allow for specifying an aspect of a video game at any suitable level of granularity, such as a level of the video game, if the video game has multiple levels. By way of example, a record of AR content 120 may be associated with Level 3 of a particular video game, but not other levels.

Individual records of AR content 120 may also be associated with an AR channel ID 230, which uniquely identifies an AR channel. AR channels are described in more detail below (e.g., with reference to FIG. 3). In short, AR channels may act as filtering criteria to filter out irrelevant AR content 120 and send relevant AR content 120 to a client machine of a user 106 based on that user's 106 AR channel subscriptions.

Individual records of AR content 120 may also be associated with game world coordinates 226. The game world coordinates 226 may be considered to be spatial data 227 that specifies particular coordinates within a game world of a particular video game, the game world being defined by a coordinate system. In this manner, whenever the game world coordinates 226 associated with a record of AR content 120 are to be rendered in a frame in order to present a portion of the game world to the player 106 of a video game 104, the AR content 120 associated with those game world coordinates 226 can be identified and used to generate an augmented frame 122 that includes the AR content 120. In an illustrative example, an author 216(1) may create AR content 120, such as an informational message, for a given level of a video game that is to be presented in a doorway whenever that doorway is rendered in a frame of a series of frames. It is to be appreciated that multiple records of AR content 120 may be associated with the same game world coordinates 226 (e.g., the doorway on a given level of the video game), and some or all of the AR content 120 associated with those game world coordinates 226 are presentable for a given player 106 of the video game, depending on the access rights the player 106 has to access the AR content 120. For example, multiple informational messages may be associated with a doorway on Level 3 of a particular video game, and some or all of these informational messages may be visible to a given player 106 as AR content 120 when the doorway is in the field of view of the player-controlled character 126.

With reference again to the game ID 224, the game ID 224 may also be usable to disambiguate between multiple instances of the game world coordinates 226 within the game world of a video game 104. In other words, the game ID 224 can make the game world coordinates 226 unique in cases where the game world coordinates are ambiguous. Consider an example where an author 216(2) wants to attach a hologram as AR content 120 to a car that is provided as video game content 124. The AR component 102 executing on the client machine 100 may need to know which car, of potentially many of the same make and model, to which it is to attach the AR content 120 (e.g., the hologram). For mobile objects, like cars, that can move around the game world, the game world coordinates 226 associated with such mobile objects may be expressed relative to the mobile object, as opposed to being expressed relative to a part of the game world environment outside of the mobile object. In this case, the game world coordinates 226 associated with a mobile object may not be enough to fully disambiguate the part of the game world to which the AR content 120 (e.g., a hologram) is to be attached, and the game ID 224 is therefore usable to fully disambiguate between multiple instances of game world coordinates 226.

As another example of how the game ID 224 can be used, consider a virtual hotel that appears in multiple different locations around the game world of a video game 104. While the video game 104 may express the game world coordinates 226 for the individual hotels relative to the hotels themselves (e.g., as if the hotel is a miniature game world in and of itself), each instance of the hotel may be uniquely identified by a different game ID 224. In general, it is to be appreciated that game world coordinates 226 may not be truly analogous to real-world coordinates due to various aspects of video games that are not shared by the real world (e.g., portals connecting disparate locations, pre-built rooms that are stitched together in a different order each time a video game is loaded (each session), etc.). For these and other reasons, the game ID 224 may be helpful to disambiguate between multiple instances of the same game world coordinates 226.

In an illustrative example, a record of AR content 120 may correspond to a screenshot (e.g., the first AR content 120(1) shown in FIG. 1) of a portion of a game world captured by a player-controlled character. When the screenshot was captured, it may have been associated with game world coordinates 226 and game ID 224, as well as a camera orientation at the time the screenshot was captured. This data can be uploaded with the associated AR content 120 to create a new record in the spatial database 204. Thus, during gameplay, when the video game 104 provides video game data 128 in the form of spatial data that specifies current game world coordinates 226 and a current game ID 224 associated with a player-controlled character 126, a screenshot associated with that spatial data can be rendered as AR content 120 on top of the video game content 124 for that frame, allowing a first gamer 106 to see the same snapshot of a game world that was seen by a second gamer 106. In some embodiments, the actual screenshot is not displayed unless and until the current player's camera orientation matches the camera orientation associated with a screenshot, and, otherwise, when the camera orientations do not match, these screenshots may be presented in the game world as "floating" images, much like the example first AR content 120(1) shown in FIG. 1. In this manner, if a plurality of screenshots were captured in the same location of a game world and uploaded to the remote computing system 200 as AR content 120, a given player 106 may see a cluster of floating images that are viewable whenever the player 106 aligns his/her player-controlled character 126 with the camera orientations associated with those screenshots.

Individual records of AR content 120 may also be associated with a state 228. To illustrate how the state 228 can be used, consider a video game that presents a game world that dynamically changes between different states over time, such as when particular events occur that alter what is happening in the game. In an illustrative example, the game world may be presented in a first state before beating a boss, and in a second state after beating the boss. In this sense, the individual records of AR content 120 can be associated with these different game world states by virtue of the state 228. That is, first AR content 120 associated with particular game world coordinates 226 may be presented in a first state of the game world by its association with a first state 228, and when the state of the game world changes, the first AR content 120 may be removed, and second AR content associated with the same game world coordinates 226 may be presented in the second state of the game world by its association with a second state 228, and so on. In an illustrative example, when a player 106 starts a boss battle, the player 106 may see first AR content 120 in the form of informational messages that wish the player "good luck" in battling the boss, and then, when the player 106 beats the boss, the player 106 may see second AR content 120 in the form of informational messages that congratulate the player for beating the boss.

As yet another example of how the state 228 can be used, consider a video game that is playable in different modes (e.g., solo mode where every player fends for themselves, duo mode where players play in pairs, squad mode where players play in larger groups, etc.). These modes can be played independently, but within the same game world of the video game. Thus, a record of AR content 120 can be associated with a state 228 that corresponds to a particular game mode. In general, the state 228 may be anything that is used to filter on the context (not necessarily spatial context) in which AR content 120 is to be rendered in an augmented frame 122.

Individual records of AR content 120 may also be associated with pixel data 232. The pixel data 232 may be particularly associated with AR content 120 in the form of screenshots that were captured by players 106 of a video game. For example, the pixel data 232 may include a 2D array of per-pixel values (e.g., color values) to reconstruct a 2D screenshot of a game world. In some embodiments, the pixel data 232 includes per pixel depth values that provide a sense of depth to the scene. Pixel data 232 that includes 3D information pertaining to a scene, can be used by the AR component 102 of a client machine 100 to construct a 3D model of a game world.

The example types of data shown in FIG. 2 as being included in records of AR content 120 of the spatial database 204 are merely examples, and there may be other types of data associated with particular records of AR content 120. For example, access rights may be associated with individual records of AR content 120 to indicate particular users or groups of users that are to have visibility to the AR content 120 while playing a video game. For example, AR content 120 can be associated with tags that specify whether the AR content 120 is visible to the general public, to friends of the author 216 who created the AR content 120, or to other specified users or user groups. In some examples, AR content 120 can be associated with user interests, spoken languages (e.g., English, Japanese, Spanish, etc.), geographic locations, times of day, and the like. These types of data may act as filtering criteria to allow for sending AR content 120 to a requesting client machine 100 whenever one or more criteria are met. These types of data may additionally, or alternatively act as rendering criteria to determine whether to render the AR content 120 (e.g., render AR content 120: if the current time corresponds to a particular time of day (e.g., within a particular time range), if the user 106 is presently located at a particular geographic location (e.g., within a particular geographic area/region), if the user 106 speaks a particular language, if the user 106 is interested in particular topics (e.g., as indicated in a user profile with user interests specified therein), etc.).

Various different types of AR content 120 may be created by authors 216 through the content-creation interface (e.g., an application programming interface (API)) that is provided by the remote computing system 200. Examples types of AR content 120 include, without limitation, informational messages (e.g., messages posted by gamers 106), virtual objects (e.g., shapes, avatars, shooting targets, etc.)—including 2D and/or 3D objects, screenshots captured by players while playing a video game—including 2D and/or 3D screenshots, video clips, interactive objects (e.g., game characters or other virtual objects or graphics that move within the game world), etc.

To enable the creation of AR content 120 (e.g., AR content 120 that is static, dynamic, or otherwise interactive), the remote computing system 200 may provide an API for authors 216 to write code (e.g., an executable program, such as a plugin, which may be implemented as a dynamic-link library (DLL), Javascript file, .exe, etc.) that is stored in a record of AR content 120 within the spatial database 204. In this scenario, instead of retrieving already-created AR content 120, video game data 128 about a current state of a video game 104 can be provided as input to the executable program of a record of AR content 120, and the executable program may generate and output AR content 120 based on the program's processing of the video game data 128. In this sense, "AR content" that is stored in a record of the spatial database 204 may, in some embodiments, include an "executable program" that is configured to generate AR content based on video game data 128 that is input to the executable program. In some embodiments, the AR component 102 executing on a client machine 100 may create a security sandbox, load one or more executable programs or plugins (e.g., DLLs) that correspond to an AR channel(s) to which the user 106 of the client machine 100 is subscribed, and provide video game data 128 to the plugins to have the plugins run their respective logic and return AR content 120. For example, there could be a folder of DLLs, each DLL representing a different plugin. When the user 106 subscribes to an AR channel(s), the AR component 102 may load the corresponding DLL(s) within a security sandbox, and then, for each frame that is to be rendered, the AR component 102 may provide video game data 128 as input to the corresponding DLL(s) that have been loaded, and may receive, as output from the DLL(s), AR content 120 that is to be rendered in the frame as an augmented frame 122. In an illustrative example, plugins can be created by authors 216 to allow for adding animated objects (e.g., game characters) to the game world of the video game 104 as an overlay of AR content 120. Using such a plugin layer, an author 216 may create a secondary game that runs separately with respect to the base (or core) video game 104 and is presented as an overlay on the video game content of the video game 104. In this sense, the video game 104 does not need to know, or care, about the AR content 120 that is rendered on top of the video game content 124, yet the interactive AR content 120 may nevertheless be dependent upon the video game data 128 about the current state of the video game 104 so that the interactive AR content 120 can be presented in an appropriate context within the game world (e.g., at an appropriate location and in a sensible manner given the geometry of the game world, at an appropriate time, etc.). In this manner, a player 106 can interact with AR content 120 by providing user input to control a player-controlled character 126. AR plugins can be executed locally on a client machine 100 or remotely at the remote computing system 200. In the latter case, AR content 120 can be received over the network 218 in real-time by client machines 100. There may be a plurality of executable programs (AR plugins) that are selectable by users 106 for download from the remote computing system 200, individual plugins generating AR content 120 for a specific purpose.

In some embodiments, the content-creation interface (e.g., API) provided by the remote computing system 200 may allow an author 216 to create an executable program (e.g., plugin) that is configured to receive, as input, video game data 128 relating to the current scene (e.g., a 3D screenshot) of a game world that is being rendered on the screen of the client machine 100, and the executable program may output the AR content. In this manner, the interactive AR content 120 can be presented in context of the game world that is being presented on the screen of the client machine 100. For instance, an author 216 can use a plugin to write an executable program that causes an AR game character to run around the game world of a video game, like an enemy that the player 106 can try to shoot, capture, or otherwise interact with. The 3D screenshot data may allow for adding such interactive content 120 in a realistic way, such as by the character running around a wall in the game world, rather than running through the wall. For video games 104 that have similar player locomotion behaviors, similar-sized worlds, and/or similar game logic, an author 216 can create an executable program that is compatible with, and functional across, multiple video games. In this manner, the AR system, including the AR module 212, can foster a culture of secondary game development where authors 216 enjoy using plugin-creation APIs to create secondary AR-based games that run "on-top-of" multiple different video games, especially those with similar game worlds and player locomotion behaviors. In this sense, the authors 216 that use the AR system disclosed herein may, in fact, be game developers that are in the business of developing secondary AR-based games. For instance, plugins can be used to create AR game sessions, which use game state from multiple game instances in order to generate AR content 120 that may then be shared across multiple client machines 100. Users 106 of those client machines 100 may be able to participate in these AR game sessions without needing to execute the same video game—some AR games could be designed to allow each user to be in a different game or within a video game in the form of an AR Viewer. User interactions within an "AR game session" can be mediated by the network 218 (e.g., the AR platform enables users to interact with each other even if there is no support in a particular video game(s) for users to interact over the network 218).

Game developers may participate in this AR system by adding minor features to their game code to support the use of executable programs that provide interactive AR content 120, as described herein. For example, video games 104 can be developed by game developers whereby the video game is configured to emit data to, and receive data from, the AR component 102 executing on a given client machine 100 for purposes of adding interactive AR content 120 as an additional layer on top of the video game content 124. For instance, a game developer may add one or more lines of code to their video game 104 that emits data whenever a bullet is shot in the game, the data specifying a vector (or ray) within the game world that provides directionality and possibly magnitude (e.g., velocity) pertaining to the bullet that was fired by a player-controlled character 126 in the video game 104. The AR component 102 may receive this emitted data and provide it as input to an executable program for a particular record of AR content 120 associated with event data that corresponds to the firing of a bullet. The executable program may respond to such an event by generating AR-based shooting targets that are positioned within the game world, and which the player 106 can try to hit using a weapon (e.g., a gun, a knife, etc.) of player-controlled character 126. The executable program may continue to receive data emitted by the video game 104 which informs the executable program as to whether an AR-based shooting target has been hit, and the executable program can output an exploding target so that the player 106 can interact with the AR-based shooting targets by shooting them and causing them to explode. This might be useful during a warm-up phase of a video game 104 for a player 106 to practice their shooting instead of just running aimlessly around a game world. In this sense, game developers can provide continued support for such AR-based interactivity in their games by updating their video games 104 to emit and/or receive particular data that is used by executable programs written by authors 216 using a plugin layer.

In some embodiments, the content-creation interface (e.g., API) provided by the remote computing system 200 may allow authors 216 to write executable programs (e.g., plugins) that provide data to the video game 104 as an additional layer of interactivity with the video game 104. For example, an API can be used to write a program (e.g., a plugin) that sends data to the video game 104 during its execution in order to control when the player-controlled character 126 gains or loses health, or to control when and/or where a particular in-game enemy appears. A game developer may have to write game code that supports this kind of two-way interaction with the AR component 102 executing on a client machine 100, and the game developer may determine when such a feature is enabled (e.g., by disabling the interactive AR content 120 during an online competitive match to prevent cheating, but allowing the interactive AR content 120 during single-player mode to provide a more dramatic and interesting AR experience on top of the base video game 104. In some embodiments, different AR plugins (executable programs) written by different authors 216 may interact with each other by passing data back and forth at the management of the AR component 102 during video game execution. For example, authors 216 may create "utility" plugins that provide "quality of life improvements" to player-controlled characters 126 (e.g., an AR plugin to visualize useful information that is omitted from the video game's 104 built-in user interface).

In some embodiments, the remote computing system 200 may maintain a repository of 3D models of game worlds 234. As mentioned, a SLAM process may be performed offline by the remote computing system 200 in order to reconstruct game world geometry and store the game world geometry in 3D models of game worlds 234. The 3D models may be of a portion of a game world such that multiple 3D models may constitute an entire game world. SLAM is a technology that uses computational algorithms to, among other things, construct a model (or map) based on recognized shapes, points, lines, etc. exhibited in an unknown topographical environment based on image data that captures at least a portion of that environment. For example, a 3D model may represent an aggregated region of a game world, reconstructed via SLAM from many game frames (e.g., reconstructed from dense temporally contiguous video streams (of color data, with or without depth buffer data)). This reconstruction can be done as a separate, backend process so that the 3D models 234 are available a priori before AR plugins begins to execute on client machines 100. For a given video game, the 3D reconstruction process may be performed by a service provider of the video game platform, by the game developer of the video game 104, or by crowd-sourcing video game screenshots from player client machines 100. User consent may be obtained before obtaining such data from client machines 100 of users 106. Furthermore, users 106 may choose to participate in the process by voluntarily exploring game worlds and uploading screenshot data to the remote computing system 200 for purposes of constructing the 3D models 234.

The SLAM-created 3D models 234 may be retrieved by client machines 100 for purposes of identifying a game world from an image of video game content 124 and determining a camera pose for purposes of adding AR content 120 in-game. In some embodiments, the 3D models 234 may be obtained by client machines 100 in order to automatically inject AR content 120 into unmodified video games and/or into pre-existing screenshots and/or videos of video games. This may enable a "streaming" use case where a video game 104 outputs a video stream without AR content 120, the AR system (e.g., the AR component 102 and/or the AR module 212) overlays AR content 120 on top of the video stream (e.g., by obtaining sufficient information from the video game, such as per-frame camera poses).

Figure 3:
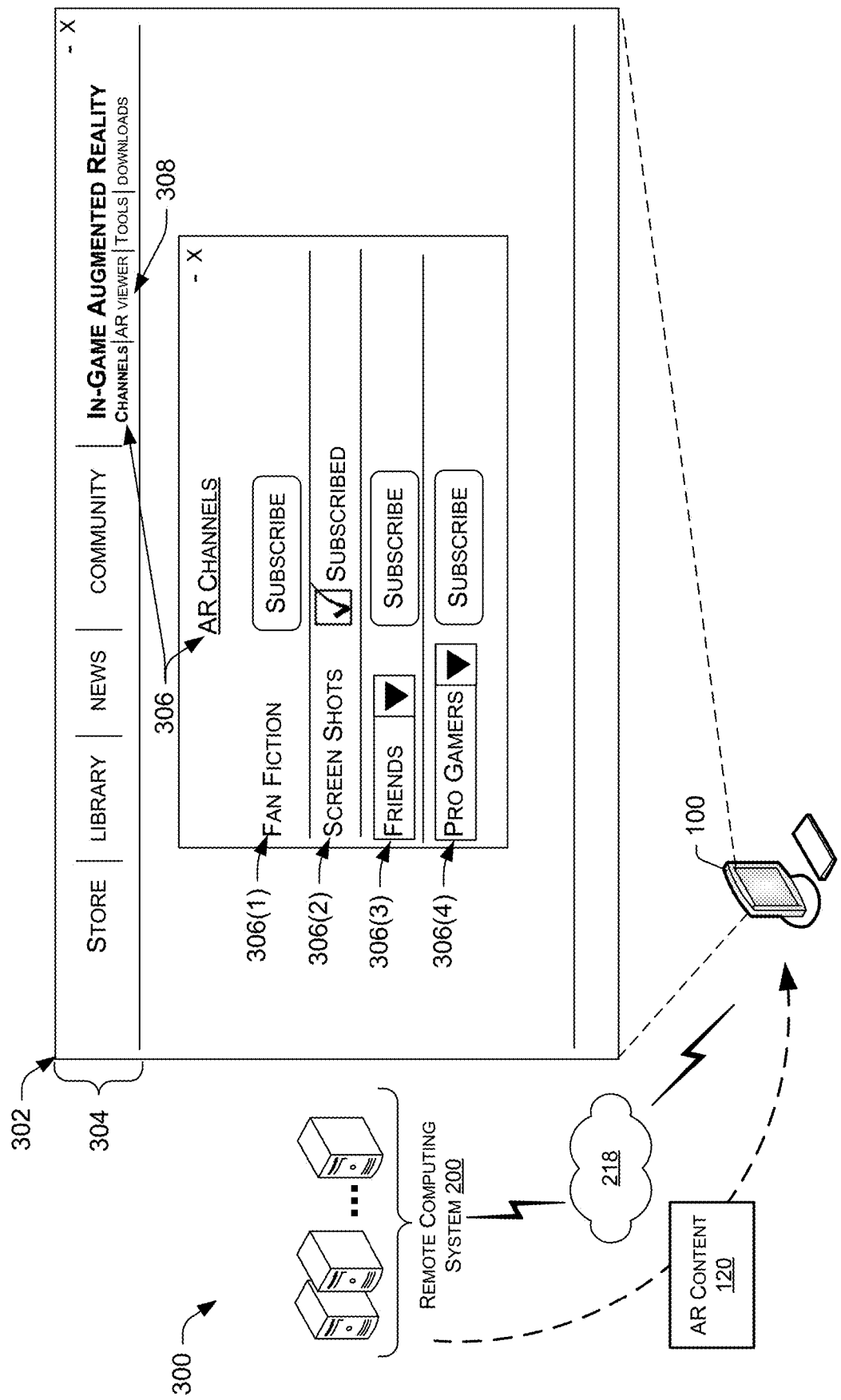
FIG. 3 is a diagram illustrating an example system whereby a client machine can subscribe to AR channels that determine the AR content that is received by the client machine.

FIG. 3 is a diagram illustrating an example system 300 whereby a client machine 100 can subscribe to AR channels that determine the AR content 120 that is received by the client machine 100. In general, the client machine 100, which may be the same as the client machine 100 described with reference to FIG. 1, may, prior to execution of a video game 104 and/or during execution of a video game 104, receive AR content 120 from the remote computing system 200 over the computer network 218. This may involve real-time streaming of AR content 120 during the execution of a video game 104, or, to reduce latency and/or network bandwidth consumption, the AR content 120 can be downloaded from the remote computing system 200 and accessed from local memory of the client machine 100 when the AR content 120 is to be rendered as part of an augmented frame 122. In some embodiments, whenever a user 106 starts a video game 104 on the client machine 100, the video game client 116 sends, over the computer network 218 to the remote computing system 200, a request that includes an identifier (e.g., the game ID 224) of the video game 104, and the remote computing system 200 uses the game ID 224 to lookup the records of AR content 120 within the spatial database 204 that are associated with the game ID 224. Thus, among the available AR content 120 maintained in the spatial database 204, the remote computing system 200 may identify a subset of the available AR content 120 that is associated with the game ID 224 it received from the client machine 100 in the request. This identified AR content 120 may be further filtered based on one or more filtering criteria, resulting in a filtered subset of AR content 120 that is ultimately sent to the client machine 100, the filtered subset of AR content 120 being the AR content 120 associated with the game ID 224 that also satisfies one or more filtering criteria. This filtering criteria may include one or more criterion that are satisfied if the user 106 who sent the request has access rights to the AR content 120. For example, if a record of AR content 120 visible exclusively to a particular group of users, that record of AR content 120 is sent to the client machine 100 if the logged-in user account that sent the request is included in the particular group of users. Otherwise, if a user 106 who is not included in that particular group of users sends a request for AR content 120, that record of AR content 120 may not be sent to the client machine 100, seeing as how the user 106 may not have access rights to that AR content 120.

Another example filtering criterion illustrated in FIG. 3 is whether the AR content 120 is associated with a channel that the user 106 of the client machine 100 has subscribed to FIG. 3 shows a user interface 302 that the video game client 116 may display on the client machine 100. The user interface 302 may include a list of menu items 304 for selection by the user to navigate to different aspects of a video game service provided by the remote computing system 200. For example a "Store" menu item 304 may allow the user 106 of the client machine 100 to browse content, such as video games within the video game catalogue 214. A "Library" menu item 304 may allow the user 106 to browse a library of content, such as the video game library 118 accessible to the client machine 100 as a result of the user 106 having acquired (e.g., purchased, rented, leased, etc.) video games. A "News" menu item 304 may allow the user 106 to browse news articles published by a content publishing entity. A "Community" menu item 304 may allow the user 106 to interact with other users 106 of a video game service, such as friends and other users of a community. An "In-Game Augmented Reality" menu item 304 may allow the user 106 of the client machine 100 to access varies AR features provided by the AR system disclosed herein. One of those AR features depicted in FIG. 3 is a "Channels" AR feature, which allows the user 106 to subscribe to different AR channels 306 that dictate the type of AR content 120 that is sent to the client machine 100 over the computer network 218, and thereby made visible to the user 106 of the client machine 100. In other words, the available AR content 120 maintained by the remote computing system 200 may be divided into AR channels 306, and users 106 can subscribe to one or more of those AR channels 306, and possibly switch between channels in order to view different types of AR content 120 during execution of a video game 104. The AR channels 306 can also be thought of as "layers" of AR content 120 that are made visible or remain hidden based on the user's 106 channel subscriptions.

FIG. 3 shows four example AR channels 306(1)-(4) that a user 106 may subscribe to, with a "Subscribe" button next to each AR channel 306 to which the user 106 has not yet subscribed. For already-subscribed channels, an indication that the user 106 has already subscribed to the AR channel 306 may be provided next to the AR channel 306, such as a "check box" next to the "Screen Shots" channel 306(2), indicating that the user 106 has already subscribed to that AR channel 306(2). For example, a user 106 can subscribe to a "Fan fiction" channel 306(1) to make AR content 120 related to Fan Fiction visible during execution of a video game 104 (e.g., multiple informational messages may be placed throughout a game world that tell a story, and possibly give hints as to where to find a next informational message, similar to geocaching). The user 106 can subscribe to a "Screen Shots" channel 306(2) to make AR content 120 comprised of screenshots visible during execution of a video game 104. A user 106 may subscribe to a "Friends" channel 306(3) to make AR content 120 associated with one or more of the user's 106 friends visible during execution of a video game 104. This type of AR channel 306(3) may be provided with a drop-down menu, or a similar selection mechanism, to select particular friends and/or groups of friends that the user 106 would like to subscribe to. The user 106 may subscribe to a "Pro Gamers" channel 306(4) to make AR content 120 associated with one or more professional gamers visible during execution of a video game 104. Again, a drop-down menu, or a similar selection mechanism, may be provided with this type of AR channel 306(4) to select particular professional gamers or groups of gamers that the user 106 would like to subscribe to. These are merely examples of the types of AR channels 306 a user 106 may subscribe to.

In some embodiments, a user 106 may subscribe to an AR channel 306 selects, and makes visible, only the AR content 120 that is currently trending (e.g., an above-threshold amount of community activity with the AR content 120, an above-threshold number of views or positive votes, trending AR content 120 among the user's 106 friends, etc.). In other words, one or more of the AR channels 306 may be configured to selectively make visible a subset of the AR content 120 for that AR channel 120 that might be of interest to the user 106, based on a heuristic that indicates a certain level of interest in the AR content 120 from other users of a community. In some embodiments, the AR module 212 of the remote computing system 200 may be configured to offer a player 106 who is currently playing a video game an option to subscribe to an AR channel 306 on-the-fly, during gameplay. For instance, a friend of the player 106 may be currently playing a treasure hunt type of AR-based secondary game, and the player 106 using the client machine 100 may be presented with a pop-up option to subscribe to an AR channel 306 that provides AR content 120 for the same treasure hunt that his/her friend is enjoying at the moment. Upon subscribing to the AR channel 306 for the treasure hunt, the client machine 100 may download the AR content 120 that provides the treasure hunt as a secondary game that runs on top of the core video game 104 executing on the client machine 100. As another example, a gamer 106 may be playing a video game 104 and may be streaming the video game to a community of users. The player 106 using the client machine 100 may see, within the game world of a video game 104 he/she is currently playing, an avatar of that gamer 106 presented within the video game world, along with a number of viewing users (e.g., 10 k, for 10,000 viewers) over the avatar, indicating that the AR content 120 is currently trending. The player 106 using the client machine 100 may click on the avatar or a subscribe button next to the avatar, to bring up a 2D or 3D broadcast of the gamer's 106 gameplay.

With specific reference again to FIG. 2, in response to the user 106 selecting a subscribe button associated with a particular AR channel 306, the client machine 100 may send a subscription request to the remote computing system 200 over the computer network 218. The remote computing system 200, upon receiving the subscription request, may identify the AR content 120 that satisfies this filtering criterion (e.g., AR content 120 associated with the subscribed-to AR channel 306) and may send this AR content 120 to the client machine 100 for use in generating augmented frames 122 with the AR content 120. Accordingly, the client machine 100 receives the AR content 120 that satisfies one or more filtering criteria (e.g., AR content 120 associated with the subscribed-to AR channel 306), and the client machine 100 may store the AR content 120 in local memory of the client machine 100, and in association with relevant data (e.g., spatial data, such as game world coordinates 226, indices 228, camera orientation data, pixel data 232, event data, etc. In this manner, the AR content 120 is retrievable from local memory whenever it is to be rendered in an augmented frame 122, which can reduce latency and/or network bandwidth consumption.

In some embodiments, the one or more filtering criteria for filtering the AR content 120 that is ultimately sent to the client machine may further include filtering criteria that is meant to reduce local memory consumption and/or network bandwidth consumption. For instance, consider a scenario where the amount of AR content 120 associated with a particular game is so great that it is difficult to download all of the relevant AR content to local memory of the client machine 100. In such a scenario, the relevant AR content 120 may be filtered based on recency (e.g., a creation date of the AR content 120), popularity (e.g., based on a number of views, number of positive votes, etc.), the author of the AR content 120 (e.g., prioritizing AR content 120 created by friends over general users), user interests known about the user 106 (e.g., user interests specified in a user profile, based on usage history, etc.), amount of data (e.g., only download AR content 120 that is less than a threshold amount of data), and so on. In this manner, the most relevant AR content 120 may be selected and less relevant AR content 120 may be filtered out so that the client machine 120 receives only the most relevant AR content 120.

Another AR feature depicted in FIG. 3 is a "AR Viewer" 308 feature. This feature allows a user 106 to select the AR Viewer 308 link to invoke an AR viewer, which is considered herein to be a type of video game 104 that can display AR content 120 out of context of video game content 124. For example, an AR viewer can present AR content 120 on a blank background or as an overlay on a SLAM-created 3D model(s) of a game world. In any case, the use of the AR Viewer 308 feature does not rely on loading a video game 104, and thus, may be executed on a client machine 100 with processing resources that may not be suitable for running a PC game (e.g., a phone). In an illustrative example, a user 106 may want to see what his/her friend is seeing right now while playing a video game 104 that is augmented with AR content 120. The user 106, on his/her phone, may select the AR viewer 308 link. The AR viewer 308 link, and a sub-link to the friend's current game session cause a query to be submitted to the remote computing system 200 with a game ID, a location in the game world where the friend's game character is currently located, and a camera orientation. Based on this data, the remote computing system 200 may access the spatial database 204 and return AR content 120 that is visible at that location with that camera orientation. This AR content 120 can be presented in a series of frames on the user's phone (e.g., in 3D), and the user 106 can look around and see his/her friend's character running around the game world the friend is currently experiencing. In this manner, the user 106 can spectate on the AR content 120 that his/her friend is currently experiencing at a remote location.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
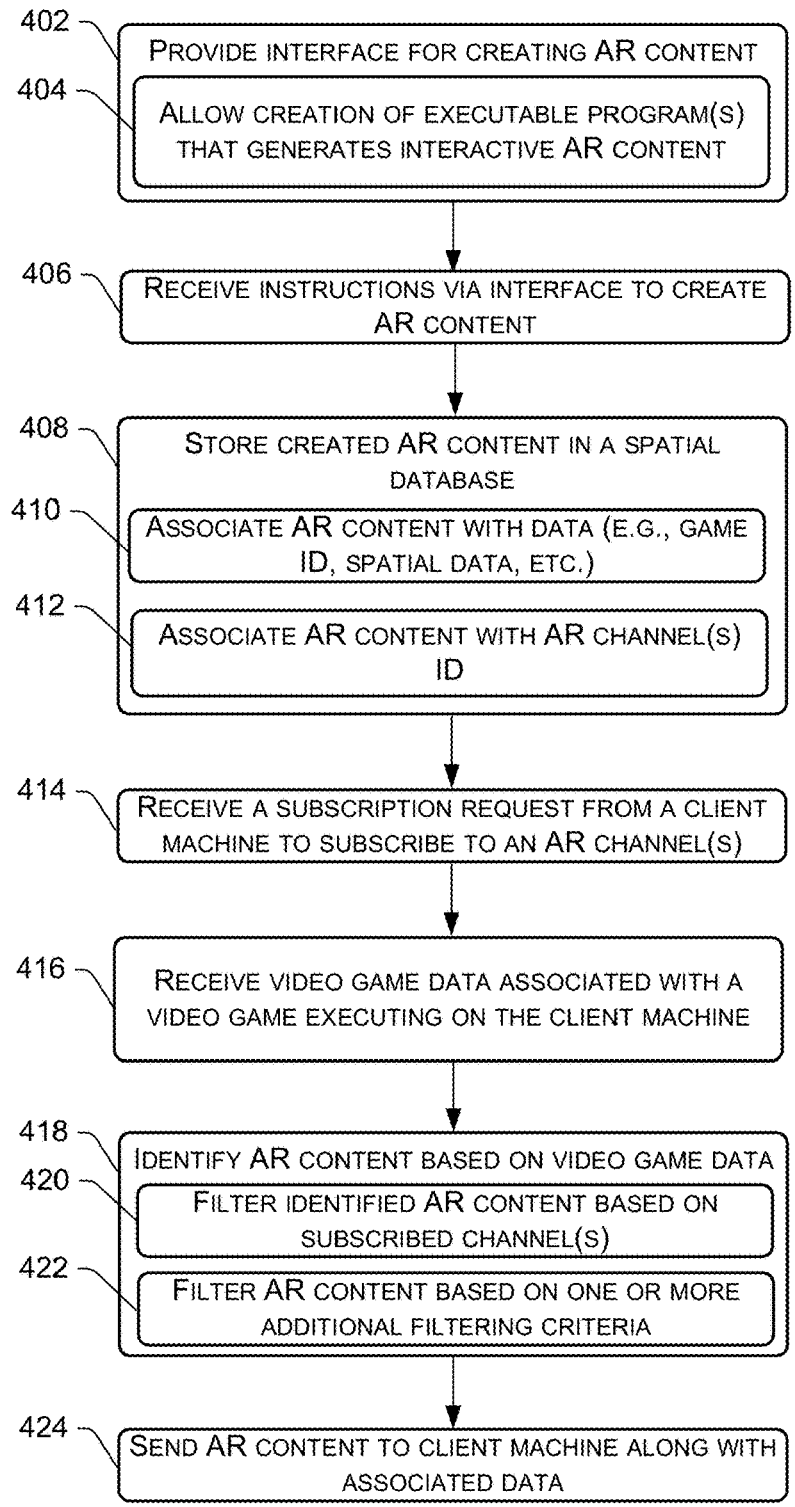
FIG. 4 is a flow diagram of an example process for providing a content-creation interface for authors to create AR content, storing the created AR content in a spatial database, and sending select AR content to a requesting client machine based on one or more filtering criteria.

FIG. 4 is a flow diagram of an example process 400 for providing a content-creation interface for authors to create AR content, storing the created AR content in a spatial database, and sending select AR content to a requesting client machine based on one or more filtering criteria. For discussion purposes, the process 400 is described with reference to the previous figures.

At 402, a remote computing system 200 may provide an interface (e.g., an API) for user computing devices 220 to create new AR content 120. This content-creation interface may be usable by authors 216 using the user computing devices 220 to create any suitable type of AR content 120, as described herein.

As shown by sub-block 404, in some embodiments, providing the content-creation interface at block 402 may allow authors 216 to create one or more executable programs (e.g., plugins) that are configured to generate interactive AR content 120 based on video game data 128 provided as input to the executable program(s). Such video game data 128 may include, without limitation, spatial data specifying, among other things, a current location of a player-controlled character or some other object in the video game, event data indicating the occurrence of a game-related event (e.g., a bullet being fired, a game character entering or exiting a vehicle a doorway, etc.).

At 406, the remote computing system 200 may receive, via the interface and from a user computing device 220, instructions to create new AR content 120. These instructions may include user input provided to the interface in the form of a graphical user interface that allows the author 216 to specify a type of AR content and other parameters relating to the AR content, such as a game ID 224 of a video game, special data 227, such as game world coordinates 226 where the AR content 120 is to be presented within the game world of the video game, event data, and the like.

At 408, the remote computing system 200 may store the new AR content 120 in the spatial database 204. As shown by sub-block 410, the storing of the new AR content 120 in the spatial database 204 may involve associating the new AR content 120 with associated data within the spatial database 204. The associated data may include, without limitation, a game ID 224 of a video game, game world coordinates 226 within a game world of the video game, an index 228 to disambiguate the game world coordinates 226 if the game world coordinates 226 are otherwise ambiguous, camera orientation data (e.g., a camera orientation associated with a captured screenshot), pixel data 232 (e.g., pixel data associated with a captured screenshot), event data, and the like.

As shown by sub-block 412, the storing of the new AR content 120 in the spatial database 204 may involve associating the new AR content 120 with one or more AR channels 306, as described herein. In this manner, users 106 may subscribe to an AR channel 306 to receive particular AR content 120 that can be displayed within a game world of their video game.

At 414, the remote computing system 200 may receive, over the computer network 218 from a client machine 100, a subscription request from a user account to subscribe to an AR channel(s) 306 as a subscribed AR channel(s) 306. Examples of AR channels 306 are described herein with reference to FIG. 3.

At 416, the remote computing system 200 may receive, over the computer network 218 from the client machine 100, video game data 128 associated with a video game 104. This video game 104 may be a video game executing via the client machine 100 (e.g., by launching the video game client 116 on the client machine 100 and executing the video game 104 via the video game client 116, causing the AR component 102 to send video game data 128 to the remote computing system 200).

At 418, the remote computing system 200 may identify, among the available AR content 120 stored in the spatial database 204, game-specific AR content 120 based at least in part on the video game data 128. For example, records of AR content 120 in the spatial database 204 may be associated with the game ID 224 for the particular video game 104 executing on the client machine 100, spatial data 227 associated with a to-be-rendered portion of a game world, etc., and that AR content 120 may be identified at block 418, as it is relevant to the particular video game 104 executing on the client machine 100, and to the current state of the video game 104, as indicated by the video game data 104.

At sub-block 420, the remote computing system 200 may filter the game-specific AR content 120 identified at block 418 based on the subscribed AR channel(s) 306 for the user account in question. This may result in a subset of the game-specific AR content 120 that is associated with the subscribed AR channel 306. For example, the AR content 120 associated with the video game 104 in question may pertain to multiple AR channels 306, so the AR channels 306 to which the user account in question has not subscribed can be used to filter out irrelevant AR content 120, and the subset of the game-specific AR content 120 remaining may be that which is associated with the subscribed AR channel(s) 306. At sub-block 422, the remote computing system 200 may further filter the game-specific AR content 120 based on one or more filtering criteria to obtain the subset of the game-specific AR content 120 that is ultimately to be sent to the client machine 100. An example filtering criterion may be satisfied at block 422 if a popularity of the subset of the game-specific AR content 120 is greater than a popularity threshold. In this example, the popularity can be determined based on at least one of a number of views or a number of positive votes associated with the subset of the game-specific AR content 120, and/or based on a user's prior activity, or the user's social network relationships. Other filtering criteria, as described herein are also contemplated, such as filtering the game-specific AR content 120 based on access rights associated with the user account, based on the creation date of the AR content 120 (filter out AR content older than a threshold age), based on user interests associated with the user account, based on a time of day, based on a geographic location associated with the client machine 100 or the user account, and so on.

At 424, the remote computing system 200 may send, over the computer network 218, the subset of the game-specific AR content 120 to the requesting client machine 100. In this manner, the client machine 100 is provided access to relevant AR content 120 that can be rendered "on top of" video game content 124 in an augmented frame 122 during execution of a video game. It is to be appreciated that at least blocks 416-424 can occur in real-time during game execution to provide real-time AR content 120 to the client machine 100 over the network 218. In some embodiments, the process 400 is performed close to a time when the video game starts executing so that the client machine 100 receives filtered game-specific AR content 120 that can be stored locally for access during game execution.

In some embodiments, at block 418, the remote computing system 200 may further identify, among the available AR content stored in the spatial database 204 and based at least in part on the video game data 128, an additional subset of the game-specific AR content 120 that is associated with an unsubscribed AR channel 306. In this scenario, at block 424, the remote computing system 200 may also send, over the computer network, the additional subset of the game-specific AR content 120 to the client machine 100 for presentation on the client machine 100 in a manner that visually distinguishes the additional subset of the game-specific AR content from the subset of the game-specific AR content. That is, AR content 120 to which the user 106 has not yet subscribed may be presented in a subtle manner (e.g., via relatively small icons that indicate AR content is available, if the user is interested to click on it). This unsubscribed AR content may be spatially-relevant based on the video game data 128.

Figure 5:
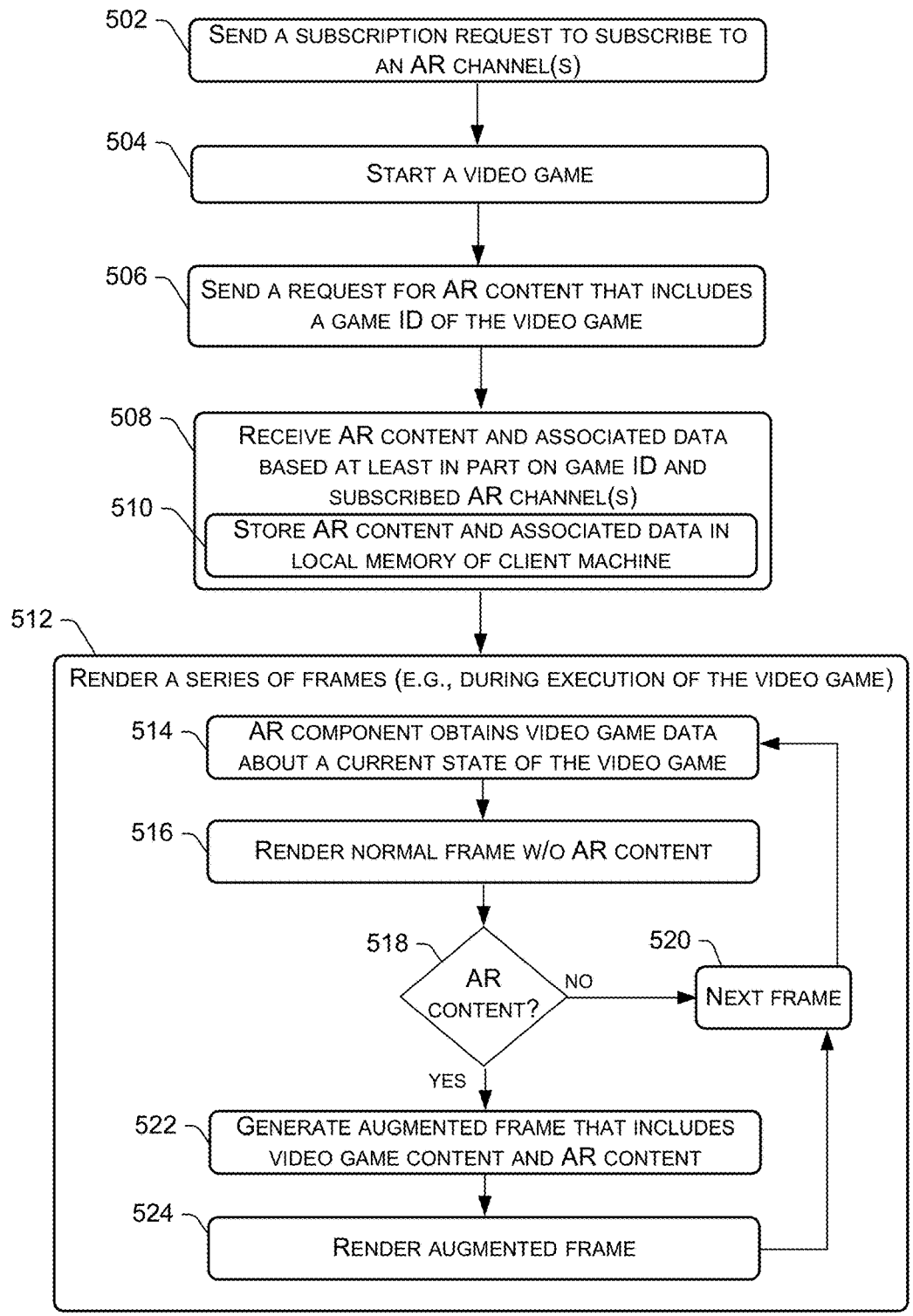
FIG. 5 is a flow diagram of an example process for receiving AR content from a remote computing system and rendering frames, including augmented frames that include the AR content, during execution of a video game.

FIG. 5 is a flow diagram of an example process 500 for receiving AR content from a remote computing system 200 and rendering frames, including augmented frames 122 that include the AR content 120, during execution of a video game 104. For discussion purposes, the process 500 is described with reference to the previous figures.

At 502, a client machine 100 may send, over a computer network 218 to a remote computing system 200, a subscription request to subscribe to an AR channel(s) 306 as a subscribed AR channel(s) 306. Examples of AR channels 306 are described herein with reference to FIG. 3.

At 504, the client machine 100 may start execution of a video game 104. For example, a user 106 of the client machine 100 may launch the video game client 116 and may select a video game 104 from a video game library 118 to start execution of the video game 104.

At 506, the client machine 100 may send, over the computer network 218 to the remote computing system 200, a request that includes a game ID 224 of the video game 104. This may be automated logic responsive to the user 106 starting execution of a video game 104 on the client machine 100. The game ID 224 allows the remote computing system 200 to lookup game-specific AR content 120 that is associated with the game ID 224.

At 508, the client machine 100 may receive, over the computer network 218, a subset of game-specific AR content 120 from the remote computing system 200 along with associated data. The subset of the game-specific AR content 120 received at block 508 may have been selected by the remote computing system 200 based at least in part on the game ID 224 and the subscribed AR channel(s) 306. Thus, the subset of the game-specific AR content 120 may be associated with both the video game 104 and with the subscribed AR channel(s) 306.

At sub-block 510, the client machine 100 may store, in local memory of the client machine 100, the subset of the game-specific AR content 120 in association with the associated data. The associated data may include, without limitation, spatial data 227, pixel data 232, event data, and the like, which may be used to determine when to render particular AR content 120 in an augmented frame 122 during game execution.

At 512, the client machine 100, via the video game client 116, may render a series of frames during execution of the video game 104. For example, as the video game 104 executes in a first process (or thread(s)), the video game 104 may output video game content 124 in a series of frames. The operations that may be iteratively performed at block 512 to render individual frames in the series of frames is shown by sub-blocks 514-524.

At 514, an AR component 102—executing via the video game client 116 on the client machine 100 as a separate process (e.g., or thread(s)) from the video game 104—may obtain, from the video game 104, video game data 128 about a current state of the video game 104. This video game data 128 may be spatial data 227 that relates to game world coordinates 226 within the game world of the video game 104. For example, the spatial data 227 may specify a current location of a player-controlled character within the game world of the video game 104, a set of game world coordinates 226 for a portion of the game world that is to be rendered in the upcoming frame, an index 228, a current orientation of a virtual camera associated with the player-controlled character, and the like. The video game data 128 may be event data specifying a game-related event associated with the video game 104. In some embodiments, obtaining the video game data 128 from the video game 104 at block 514 may include the AR component 102 receiving the video game data 128 from the video game 104 as part of a function call made by the video game 104 to request the AR content 120 from the AR component 102 in order to render the frame as the augmented frame 122, if necessary.

At 516, the frame may be rendered as a normal frame without any AR content 120 (i.e., exclusively with video game content 124). At 518, the AR component 102 may determine whether AR content 120 can be identified based on the video game data 128. For example, the AR component 102 may compare at least a portion of the video game data 128 it obtained at block 514 to the associated data stored with the accessible AR content 120 (e.g., the subset of the game-specific AR content 120 the client machine 100 received at block 508). If the AR component 102 determines that there is no identifiable AR content 120 to be displayed, the process 500 may follow the "NO" route from block 518 to proceed to the next frame at block 520. If, on the other hand, the AR component 102 determines that there is identifiable AR content 120 to be displayed, the AR component 102 identifies the AR content 120 based at least in part on the video game data 120 (e.g., by comparing the video game data 128 to the associated data stored with the AR content 120), and the process 500 may follow the "YES" route from block 518 to block 522. The identification of the AR content 120 may include retrieving/receiving the AR content 120 from a source other than the video game 104 (e.g., from local memory of the client machine 100, from the remote computing system 200 in real time, etc.). In the case of real-time retrieval of AR content 120 over the network 218, the receiving of the AR content at block 508 may occur in conjunction with (e.g., in response to) the identification of the AR content 120 at block 518.

At 522, the client machine 100, via the AR component 102, may generate an augmented frame 122 that includes the video game content 124 output by the video game 104 and the AR content 120 identified and retrieved at block 516. As mentioned, the generation of the augmented frame 122 may include overlaying the AR content 120 on the video game content 124. In some embodiments, the operations at block 522 include obtaining depth data associated with the video game content 124 for the given frame, and merging the video game content 124 and the AR content 120 in the augmented frame 122 based at least in part on the depth data. For instance, AR content 120 may be layered over some video game content 124 (e.g., opaque graphics) and under other video game content 124 (e.g., translucent graphics).

At 524, the client machine 100, via the AR component 102, may render the augmented frame 122 on a display(s) 110 associated with the client machine 100, and may then proceed to the next frame at block 520 to iterate blocks 514-524, as shown by the arrow from block 520 to block 514.

The player 106 can effectively change the AR channel 306 at any time during the process 500 by subscribing to one or more different AR channels 306, which causes the client machine 100 to send a new subscription request to the remote computing system 200 so that different or additional AR content 120 can be received from the remote computing system 200 based on the newly subscribed AR channel(s) 306. In this manner, the player 106 can switch between AR channels 306 during gameplay to have different AR content 120 presented in augmented frames 122 during execution of the video game.

Figure 6:
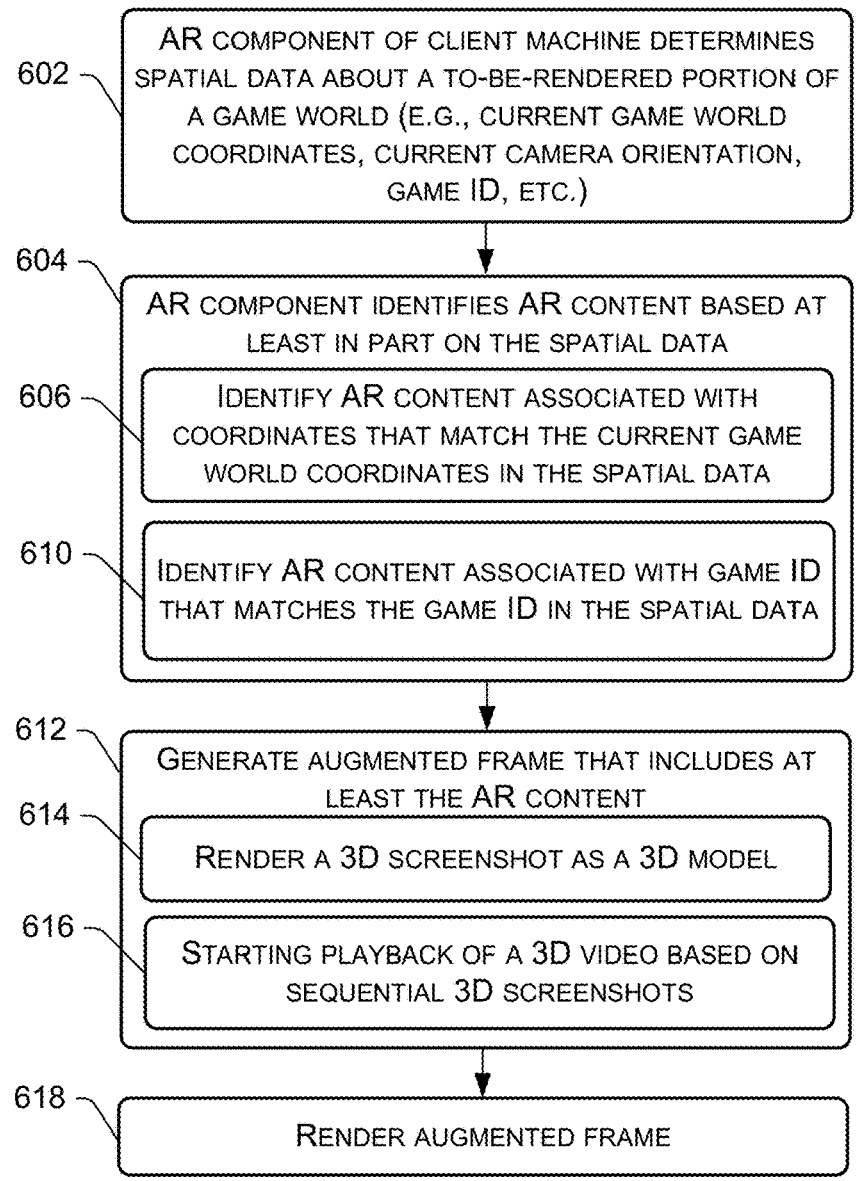
FIG. 6 is a flow diagram of an example process for augmenting a frame with spatially-relevant AR content during execution of a video game.

FIG. 6 is a flow diagram of an example process 600 for augmenting a frame with spatially-relevant AR content 120 during execution of a video game 104. The operations of the process 600 may be involved in rendering an individual frame as an augmented frame in the series of frames that are rendered during the execution of the video game. For discussion purposes, the process 600 is described with reference to the previous figures.

At 602, an AR component 102—executing via the video game client 116 on a client machine 100—may obtain, from the video game 104, video game data 128 in the form of spatial data 227 about a current state of the video game 104. For example, the spatial data 227 obtained at block 602 may relate to, without limitation, current game world coordinates, such as the current coordinates (i.e., current location) of a player-controlled character 126 within the game world of the video game 104, a set of game world coordinates 226 for a portion of the game world that is to be rendered in the upcoming frame, a game ID 224, a state 228, a current camera orientation of a virtual camera (e.g., a virtual camera associated with the player-controlled character 126), or any combination thereof.

At 604, the AR component 102 may identify AR content 120 from available AR content (e.g., a subset of game-specific AR content 120 received from a remote computing system 200) based at least in part on the spatial data 227.

At sub-block 606, the AR content 120 can be identified based at least in part on the game world coordinates 226 in the received spatial data 227. For example, the AR component 102 may identify AR content 120 that is associated with game world coordinates 226 that are included in the set of game world coordinates 226 in the spatial data 227, or that are within a threshold distance from a current location of the player-controlled character 126 and within a field of view of the game character 126, as determined from the current orientation of the virtual camera.

At sub-block 610, the AR content 120 can be identified based at least in part on the game ID 224 specified in the spatial data 227. For example, the AR component 102 may identify AR content 120 that is associated with a game ID that matches the game ID 224 in the spatial data 227. This game ID may be usable to disambiguate between multiple instances of game world coordinates 226, if the game world includes multiple instances of the game world coordinates 226 specified in the spatial data 227.

At 612, the client machine 100, via the AR component 102, may generate an augmented frame 122 that includes t the AR content 120 identified (and retrieved) at block 604 (and possibly the video game content 124 output by the video game 104). As shown by sub-block 614, in the case of the identified AR content 120 being a 3D screenshot (e.g., an image with depth data), the generation of the augmented frame 122 at block 612 may include constructing a 3D model of a portion of a game world exhibited in the 3D screenshot based at least in part on the data included in the 3D screenshot (e.g., the 2D array of pixel data plus depth data from a depth buffer). The resulting 3D model can be overlaid on video game content 124 within the augmented frame 122 at block 612. For instance, the identified AR content 120 may be a 3D screenshot of the game world of the video game 104 that is currently executing on the client machine, or a different game world of a different video game. In either case, the 3D screenshot may have been captured by another gamer 106, perhaps at an earlier time, capturing the full context of the game world in that instant when the 3D screenshot was captured. The constructed 3D model that is overlaid on the video game content 124 as AR content 120 may allow the player 106 of the currently-executing video game 104 to navigate around the constructed 3D model (e.g., move around objects captured in the 3D screenshot) to see the "slice" of the game world captured by the other gamer 106, and in a way that mimics what the other gamer 106 saw at the time the 3D screenshot was captured. As shown by sub-block 616, in the case of the identified AR content 120 being a plurality of sequential 3D screenshots, the generation of the augmented frame 122 at block 612 may include starting playback of a 3D video based at least in part on the plurality of sequential 3D screenshots.

At 618, the client machine 100, via the AR component 102, may render the augmented frame 122 on a display(s) 110 associated with the client machine 100, and may then proceed to the next frame as part of an iterative process of rendering a series of frames during execution of the video game 104.

Figure 7:
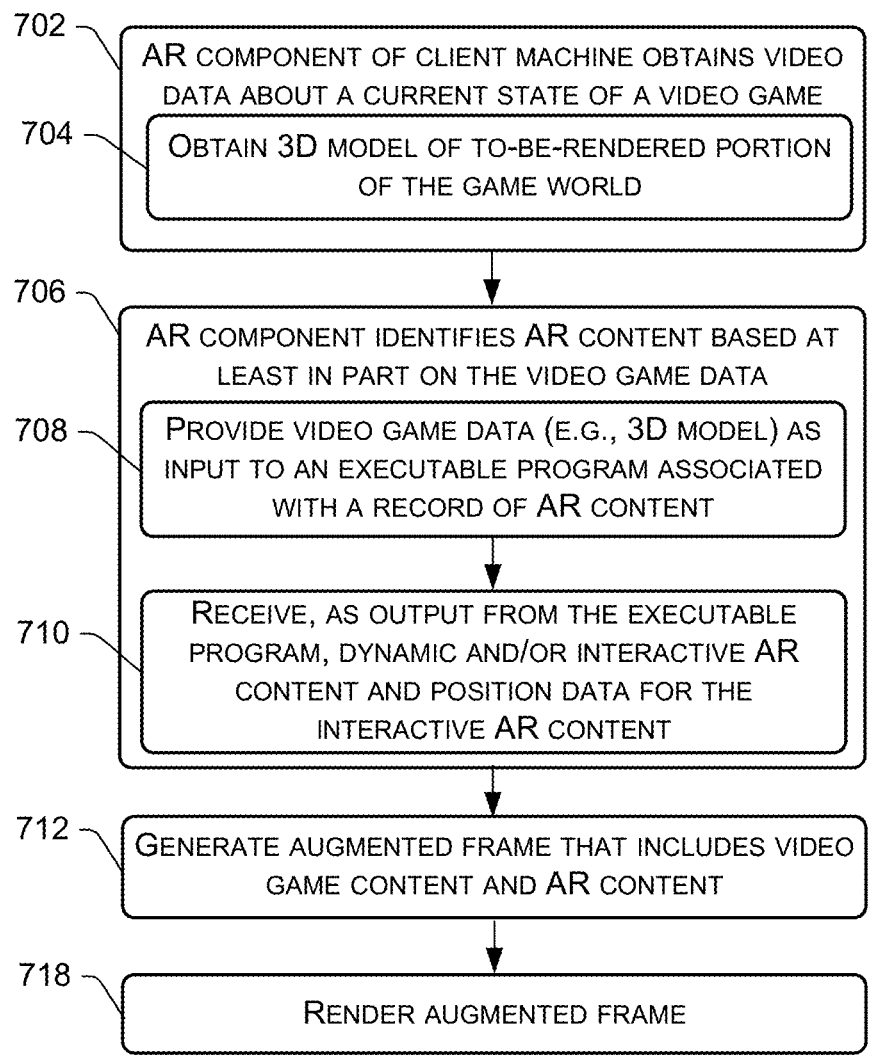
FIG. 7 is a flow diagram of an example process for augmenting a frame with dynamic and/or interactive AR content during execution of a video game.

FIG. 7 is a flow diagram of an example process 700 for augmenting a frame with dynamic and/or interactive AR content 120 during execution of a video game 104. The operations of the process 700 may be involved in rendering an individual frame as an augmented frame in the series of frames that are rendered during the execution of the video game. For discussion purposes, the process 700 is described with reference to the previous figures.

At 702, an AR component 102—executing via the video game client 116 on a client machine 100—may obtain video game data 128 about a current state of a video game 104, as described herein. As shown by sub-block 704, obtaining the video game data 128 may include obtaining a 3D model of a to-be-rendered portion of the game world in the upcoming frame. This 3D model may be retrieved from the remote computing system 200, which may have previously generated 3D models for the game world of the video game based on dense, temporally contiguous video streams (e.g., including color data with, or without, depth buffer data) and stored the 3D models for client machines 100 to access on demand. A SLAM process may be performed offline and may be used to reconstruct game world geometry (e.g., 3D models of game worlds) incrementally from many images. This backend process may be done by a service provider of the video game platform, by game developers, and/or by crowdsourcing game world images from player client machines 100.

At 706, the AR component 102 may identify AR content 120 from available AR content (e.g., a subset of game-specific AR content 120 received from a remote computing system 200) based at least in part on the video game data 128. In order to identify the AR content 120, the AR component 102 may lookup a record of AR content 120 from available AR content using the video game data 128 and may determine that the record of AR content 120 provides an executable program that is configured to generate dynamic and/or interactive AR content 120. This executable program may have been created by using a plugin, as described herein.

At sub-block 708, the AR component 102 may provide the video game data 128 (e.g., the 3D model obtained at block 704) as input to the executable program that is configured to generate the dynamic and/or interactive AR content 120 based at least in part on the video game data 128. In some embodiments, the AR component 102 may create a security sandbox, load one or more executable programs or plugins (e.g., DLLs) that correspond to an AR channel(s) to which the user 106 of the client machine 100 is subscribed, and provide video game data 128 as input to the plugins to have the plugins run their respective logic and return AR content 120. For example, there could be a folder of DLLs, each DLL representing a different plugin. When the user 106 subscribes to an AR channel(s), the AR component 102 may load the corresponding DLL(s) within a security sandbox, and then run through the process 700 where, at sub-block 708, the AR component 102 may provide video game data 128 as input to the corresponding DLL(s) that have been loaded.

At sub-block 710, the AR component 102 may receive, as output from the executable program(s), the identified AR content as the dynamic and/or interactive AR content 120. The AR component 102 may also receive, as output from the executable program(s), position data for positioning the dynamic and/or interactive AR content 120 within an augmented frame 122, the position data based at least in part on the 3D model of the to-be-rendered portion of the game world.

At 712, the client machine 100, via the AR component 102, may generate an augmented frame 122 that includes the video game content 124 output by the video game 104 and the AR content 120 identified at block 706. By providing the 3D model as input to the executable program, dynamic (e.g., moving and/or animating) AR objects can be automatically injected into the game world in a manner that is sensible with respect to the geometry and/or topology of the game world. For instance, a moving or animating AR game character may be move within the game world by avoiding collisions with virtual objects in the game world, such as barriers, walls, doors, etc., and/or positioning AR content against walls, on the floor, etc.

At 718, the client machine 100, via the AR component 102, may render the augmented frame 122 on a display(s) 110 associated with the client machine 100, and may then proceed to the next frame as part of an iterative process of rendering a series of frames during execution of the video game 104.

Figure 8:
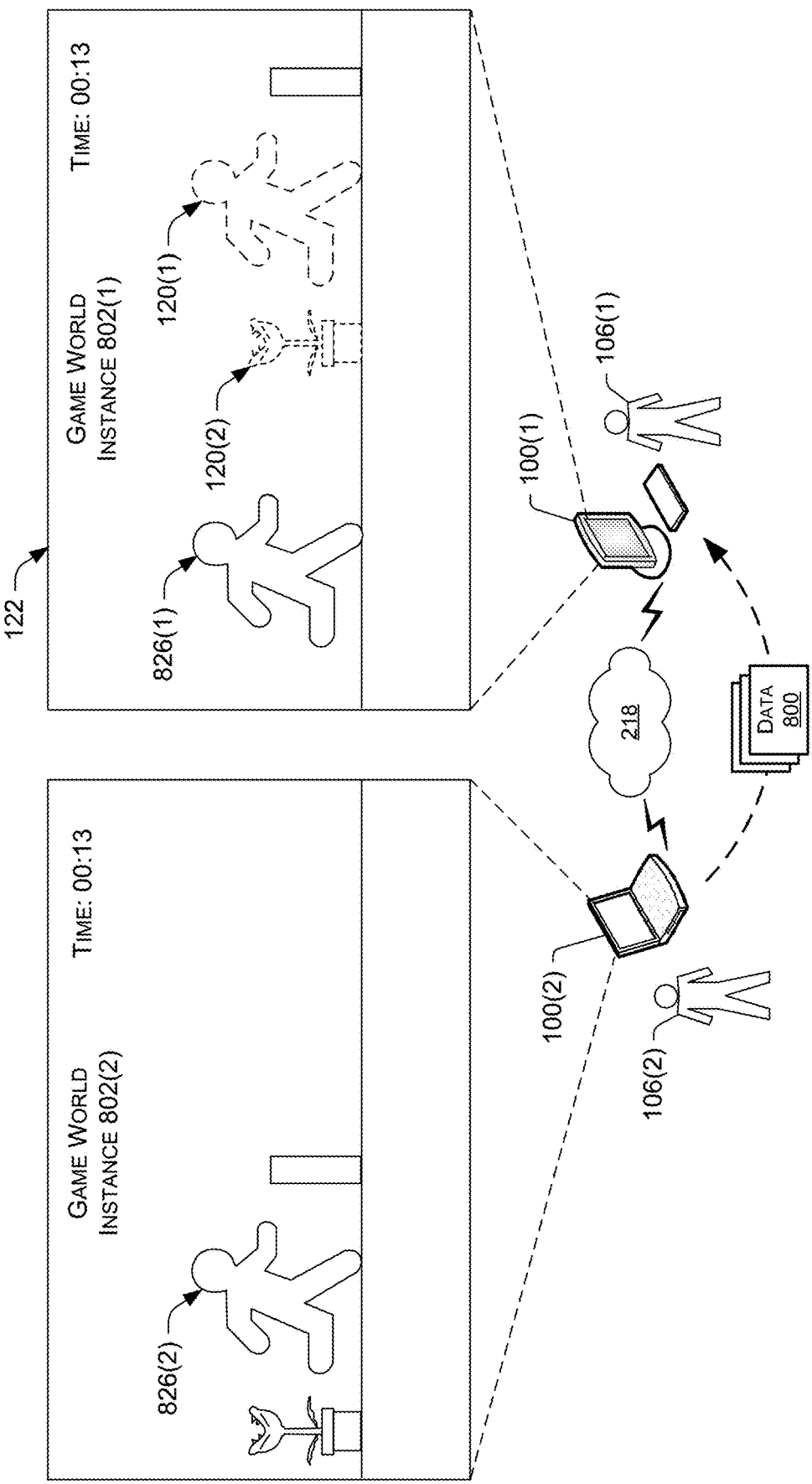
FIG. 8 is a diagram illustrating an example technique for adding multiplayer aspects to a single player video game using the disclosed AR system.

FIG. 8 is a diagram illustrating an example technique for adding multiplayer aspects to a single player video game using the disclosed AR system. In FIG. 8, a first client machine 100(1) and a second client machine 100(2) are each connected to a computer network 218 in order to exchange data with the remote computing system 200 (not shown in FIG. 8) and with other client machines 100 over the computer network 218. In the example of FIG. 8, a first player 106(1) is playing a video game 104 on the first client machine 100(1), and a second player 106(2) is also playing the same video game 104 on the second client machine 100(2). The video game 104 can be independently executed on each client machine 100 without any networking code such that there is no reliance on a network connection to execute the video game 104. In this sense, the video game 104 executing on each client machine may, in some examples, be a single player video game that the individual players 106 can play by themselves.

The network connection, however, enables the transfer of data 800 via the remote computing system 200 and between client machines 100 that are executing the same single player video game 104, as shown in FIG. 8. This allows for adding multiplayer aspects to a single player video game without any reliance on the game developer to accommodate multiplayer aspects into their video game, which can be a costly endeavor. Instead, the code of the video game 104 may be configured to iteratively emit data 800 (e.g., emit data 800 every frame, every couple of frames, every few frames, etc.) about a current state of the video game 104. This data 800 emitted from the video game 104 executing on the second client machine 100(2) can be transmitted over the computer network 218 to the first client machine 100(1) that is executing a local AR component 102. The AR component 102 on the first client machine 100(1) may receive the data 800 sent from the second client machine 100(2) and may process the data 800 to generate an augmented frame 122 that includes AR content 120(1) that adds multiplayer aspects to a first instance of the game world rendered on the first client machine 100(1). For example, a ghost image of the second player's 106(2) game character can be rendered on the screen of the first client machine 100(1) as AR content 120(1) to enable a multiplayer aspect like "speed running" where the first player 106(1) can see where the second player's 106(2) game character is relative to the first player's 106(1) game character. In this manner, the first player 106(1) can compete with the second player 106(2) without having to implement multiplayer aspects into the code of the video game 104 itself. These multiplayer aspects can be added in real-time by sending the data 800 over the network 218 in real-time as the video game 104 is played on each client machine 100. Additionally, or alternatively, a game performance of the second player 106(2) can be saved and replayed as an AR content stream during execution of the video game 104 on the first client machine 100(1) at a later time. In this manner, the AR content 120(1) that is retrieved and used to augment the frames during gameplay on the first client machine 100(1) may be a live or replayed stream of a second player's 106(2) game performance in the same video game 104. In this manner, a first player 106(1) can compete in real-time, and/or the first player 106(1) can keep practicing over and over against a replay of the second player's 106(2) game performance. In some embodiments, frames, including the augmented frames 122, rendered on the first client machine 100(1) may be saved and uploaded to the remote computing system 200 as a video clip so that others can replay the competitive experience, as seen by the first player 106(1).

In another aspect, the game world 802(2) can be stitched into the game world 802(1) on the first client machines 100(1) to effectively mix the two game worlds 802(1) and 802(2) together in a manner that aligns the coordinate systems of the two game worlds 802(1) and 802(2). For example, if the two player controlled characters 826(1) and 826(2) are located near each other (e.g., within a threshold distance) within the same game world of the same video game 104, at the same time, the first client machine 100(1) can receive, from the second client machine 100(2), a 3D screenshot(s) of the second game world 802(2) along with a set of coordinates for that portion(s) of the second game world 802(2) depicted in the 3D screenshot(s), and the AR component 102 of the first client machine 100(1) may align the graphics in the received screenshot with the current set of coordinates in first game world 802(1) to mix the two game worlds together. For example, the first player 106(1) may be able to see an object as AR content 120(2) that is seen by the second player 106(2) in the second game world 802(2). The differences between the two game worlds 802 (1) and 802(2) in the augmented frame 122 can be indicated visually through highlighting of objects or graphics rendered as AR content 120 (e.g., using a different color, etc.). In FIG. 8, the differences between the two game worlds 802(1) and 802(2) is shown in the augmented frame 122 by the objects from the second game world 802(2) shown in dashed lines, while the objects in the first game world 802(1) are shown in solid lines. A visual distinction may help the first player 106(1) distinguish between video game content 124 and AR content 120, when the AR content 120 is stitched into the first game world 1002(1) in a way that would otherwise make it difficult to discern what is AR content 120 in the augmented frame 122.

Figure 9:
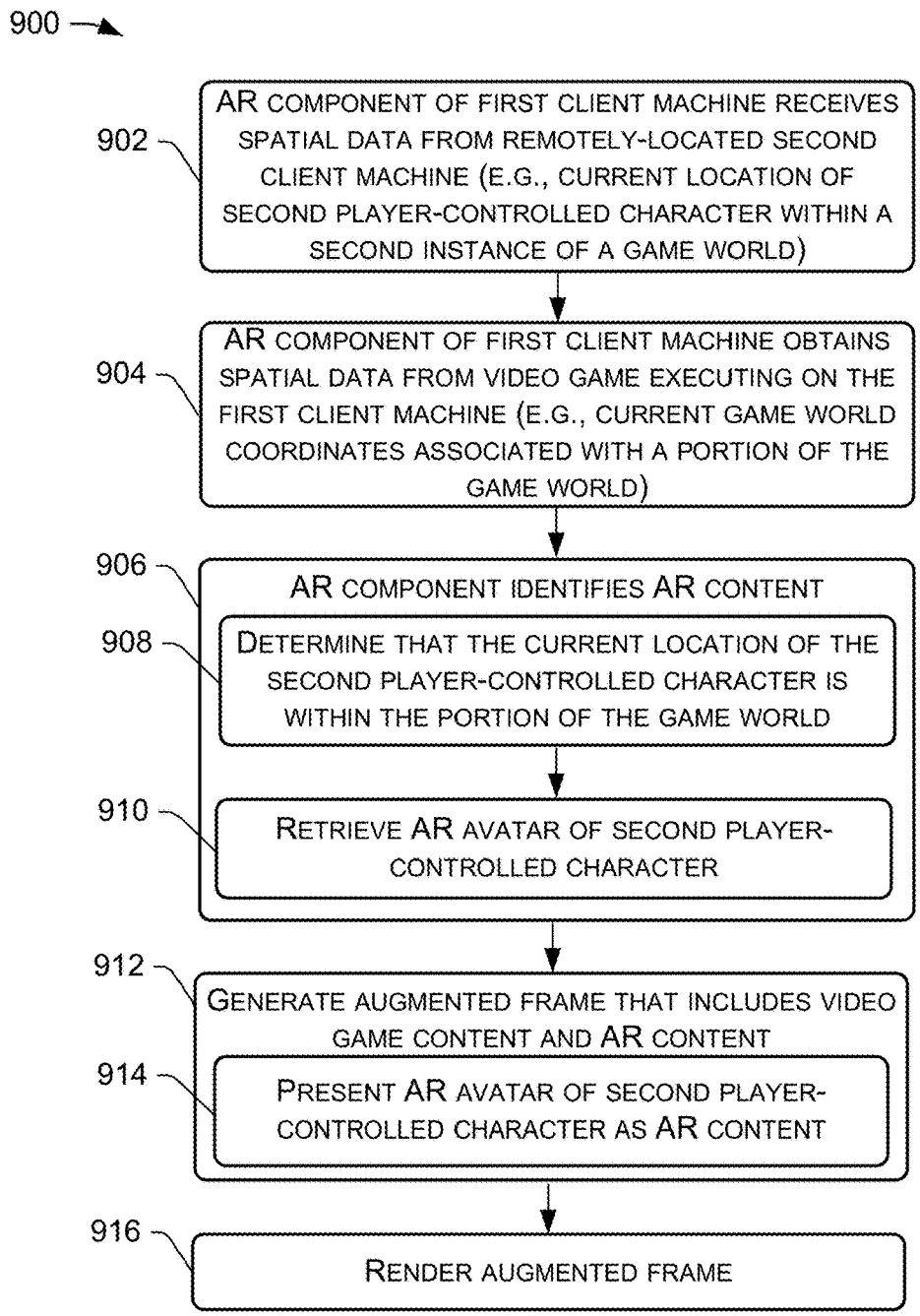
FIG. 9 is a flow diagram of an example process for using an AR system to add multiplayer aspects to a single player game through the exchange of data between client machines over a computer network.

To illustrate the operation of the technique shown in FIG. 8, reference is now made to FIG. 9, which is a flow diagram of an example process 900 for using an AR system to add multiplayer aspects to a single player game through the exchange of data between client machines 100 over a computer network 218. Consider, a scenario where a first instance of a game world 802(1) is being rendered on the first client machine 100(1) during execution of the video game 104 on the first client machine, and a second instance of the same game world 802(2) is being rendered on the second client machine 100(2) during an independent execution of the same video game 104 on the second client machine 100(2). As shown in FIG. 8, during the independent execution of the video game 104 on each client machine 100, the first player 106(1) may control a first player-controlled character 826(1), while the second player 106(2) may control a second player-controlled character 826(2).

At 902, the first client machine 100(1) may receive, over a computer network 218 from a second client machine 100(2), data 800 in the form of spatial data 227 that specifies a current location of a second player-controlled character 826(1) within the game world rendered on the second client machine 100(2) as a second instance of the game world 802(2).

At 904, in order to render an augmented frame 122 on the first client machine 100(1) (e.g., as shown in FIG. 8 by reference numeral 122), the AR component 102 executing on the first client machine 100(1) may obtain video game data 128 from the video game 104 executing on the first client machine 100(1), the video game data 128 in the form of spatial data 227 that specifies first game world coordinates 226 associated with a portion of a game world of the video game 104 that is to be rendered on the first client machine 100(1) as a first instance of the game world 802(1).

At 906, the AR component 102 of the first client machine 100(1) identifies AR content 120 to use in generating an augmented frame 122. As shown by sub-block 908, the AR content 120 can be identified by determining that the current location of the second player-controlled character 826(2) is within the portion of the game world that is to-be-rendered on the screen of the first client machine 100(1) based at least in part on the first game world coordinates 226. As shown by sub-block 910, the AR content 120 can be retrieved as an AR avatar of the second player-controlled character 826(2). For instance, the first client machine 100(1) may receive AR content 120 in the form of an AR avatar from the remote computing system 200 (prior to, or during, execution of the video game 104). In this manner, a record of AR content that includes the AR avatar is accessible to the first client machine 100(1).

At 912, the first client machine 100(1), via the AR component 102, may generate an augmented frame 122 that includes the video game content 124 output by the video game 104 executing on the first client machine 100(1) and the AR content 120 identified (and retrieved) at block 906. As shown by sub-block 914, the generation of the augmented frame 122 may include presenting the AR avatar of the second player-controlled character 826(2) as AR content 120 on the video game content 124 at a location within the first instance of the game world 802(1) that corresponds to the current location of the second player-controlled character 826(2).

At 916, the first client machine 100(1), via the AR component 102, may render the augmented frame 122 on a display(s) 110 associated with the first client machine 100 (1), and may then proceed to the next frame as part of an iterative process of rendering a series of frames during execution of the video game 104. An example of this augmented frame 122 is shown in FIG. 8, where the AR content 120 in the augmented frame 122 is the AR avatar of the second player-controlled character 826(2), at a location that corresponds to that game character's current location in the game world. This allows for multiplayer aspects to be added as an augmentative feature in the video game that is executing on the first client machine 100(1), which may be a single player game.

Figure 10:
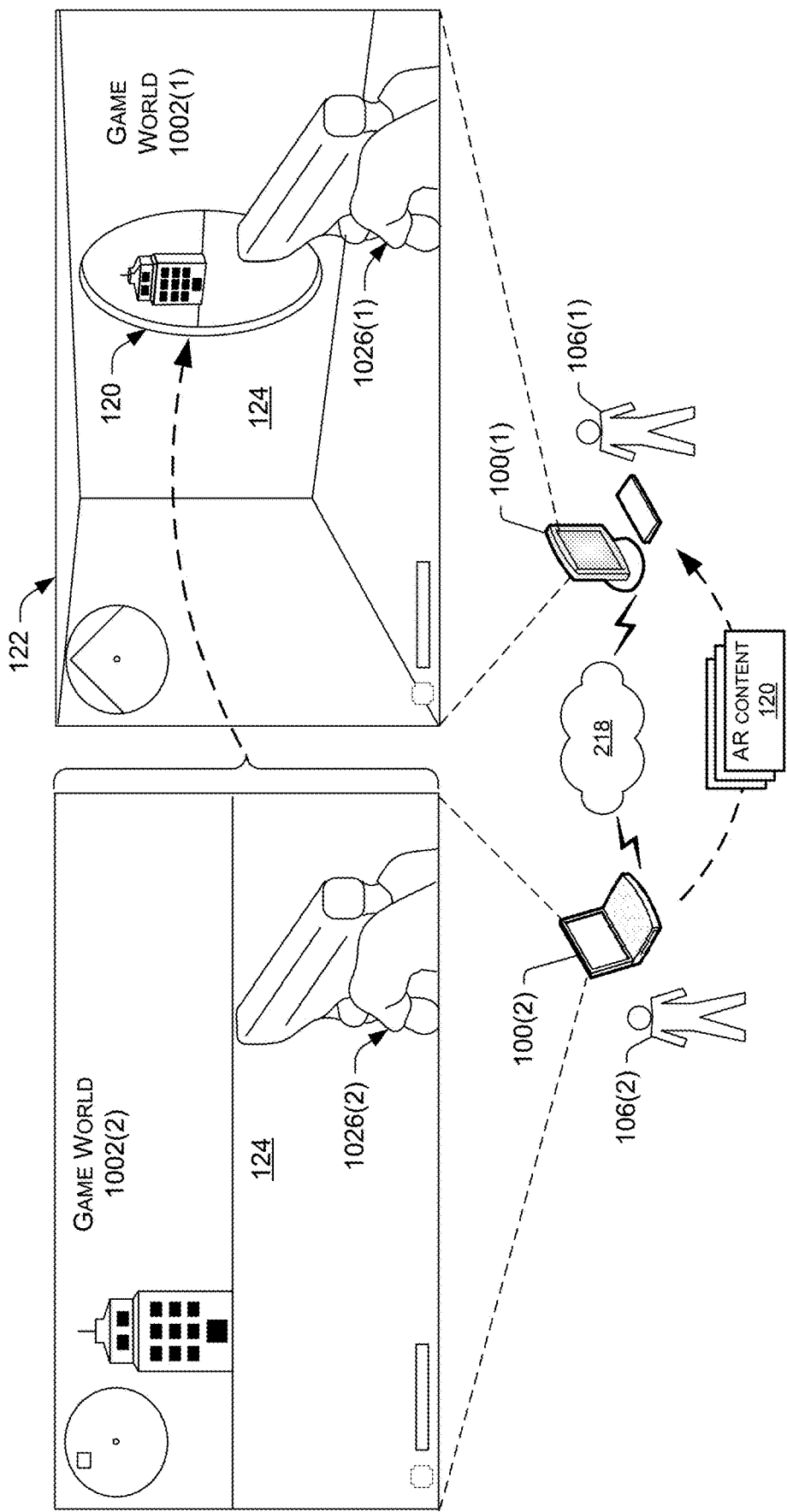
FIG. 10 is a diagram illustrating an example technique for using the disclosed AR system to share aspects of game worlds between client machines.

FIG. 10 is a diagram illustrating an example technique for using the disclosed AR system to share aspects of game worlds between client machines. In FIG. 10, a first client machine 100(1) and a second client machine 100(2) are each connected to a computer network 218 in order to exchange data with the remote computing system 200 (not shown in FIG. 10) and with other client machines 100 over the computer network 218. In the example of FIG. 10, a first player 106(1) is playing a video game 104 on the first client machine 100(1), and a second player 106(2) is playing a video game 104 on the second client machine 100(2). The video game 104 executing on each client machine 100 can be the same video game or different video games, and they may be single player or multiplayer video games.

The network connection enables the transfer not only data, but also AR content 120 via the remote computing system 200 and between the client machines 100. For example, the AR content 120 sent from the second client machine 100(2) to the first client machine 100(1) may represent screenshots (e.g., 2D or 3D screenshots) of a portion of a second game world 1002(2) being rendered on the second client machine 100(2). This AR content 120 can be iteratively transmitted (e.g., every frame, every couple of frames, every few frames, etc.) during execution of a video game 104 on the second client machine 100(2). The AR component 102 on the first client machine 100(1) may receive the AR content 120 sent from the second client machine 100(2) and may use the AR content 120 to generate an augmented frame(s) 122 that includes the received AR content 120. Thus, the real-time transmission, over the network 218, of AR content 120 in the form of screenshots allows for sharing of games worlds between client machines, such as the sharing of the second game world 1002(2) within the first game world 1002(1) that is being rendered on the first client machine 100(1). For example, as the second player 106(2) controls the movement of a second player-controlled character 1026(2) around the second game world 1002(2), screenshots of the second game world 1002(2), as seen from the perspective of the second player-controlled character 1026(2), can be sent as AR content 120 over the network 218 to the first client machine 100(1). As the first player 106(1) controls the movement of a first player-controlled character 1026(1) around the first game world 1002(1), the received screenshots can be presented in augmented frames 122 as AR content 120, such as by rendering the screenshots through a "portal" on a wall in the first game world 1002(1). This can enable different types of functionality relating to the sharing of game worlds between client machines.

For example, the AR content 120 may provide the first player 106(1) with a viewport into the second game world 1002(2). In this scenario, one or more screenshots of the second game world 1002(2), as seen from the perspective of the second player-controlled character 1026(2) may be transmitted to the first client machine 100(1) for display as AR content 120 within the first game world 1002(1). A series of screenshots can be transmitted over the network 218 to enable live spectating of the second player's 106(2) gameplay. For example, a first player 106(1) may be able to spectate the second player's 106(2) gameplay through the AR content 120 that is presented as a viewport into the second game world 1002(2). The series of screenshots transmitted over the network 218 can be presented as a live AR video stream via the AR component 102 on the first client machine 100(1) so that the first player 106(1) can watch the second player-controlled character 1026(2) move around the second game world 1002(2). In order to enable a 3D viewport into the second game world 1002(2), the first client machine 100(1) may receive AR content 120 in the form of a 3D screenshot(s), and the AR component 102 on the first client machine 100(1) may construct a 3D model of the game world 1002(2) depicted in the 3D screenshot and/or present the 3D screenshot positioned based on a camera orientation associated with the 3D screenshot. This can allow the first player 106(1) to look around and/or move around the reconstructed 3D model of the second game world 1002(2) to see even more detail about the environment of the second player-controlled character 1026(2).

Another example of sharing game worlds between client machines 100 involves stitching or mixing two game worlds 1002(1) and 1002(2) together in a manner that aligns the coordinate systems of the two game worlds 1002(1) and 1002(2). For example, if the two player controlled characters 1026(1) and 1026(2) are located near each other (e.g., within a threshold distance) within the same game world of the same video game 104, at the same time, the first client machine 100(1) can receive, from the second client machine 100(2), a 3D screenshot(s) of the second game world 1002(2) along with a set of coordinates for that portion(s) of the second game world 1002(2) depicted in the 3D screenshot(s), and the AR component 102 of the first client machine 100(1) may align the graphics in the received screenshot with the current set of coordinates in first game world 1002(1) to mix the two game worlds together. Imagine the first player-controlled character 1026(1) located at the same location within a game world as the second player-controlled character 1026(2), and the first player 106(1) being able to see a 3D rendering of an enemy (AR content 120) seen by the second player 106(2) in the second game world 1002(2). The differences between the two game worlds 1002(1) and 1002(2) in the augmented frame 122 can be indicated visually through highlighting of objects or graphics rendered as AR content 120 (e.g., using a different color, etc.). This may help the first player 106(1) distinguish between video game content 124 and AR content 120, when the AR content 120 is stitched into the first game world 1002(1) in a way that would otherwise make it difficult to discern what is AR content 120 in the augmented frame 122.

Figure 11:
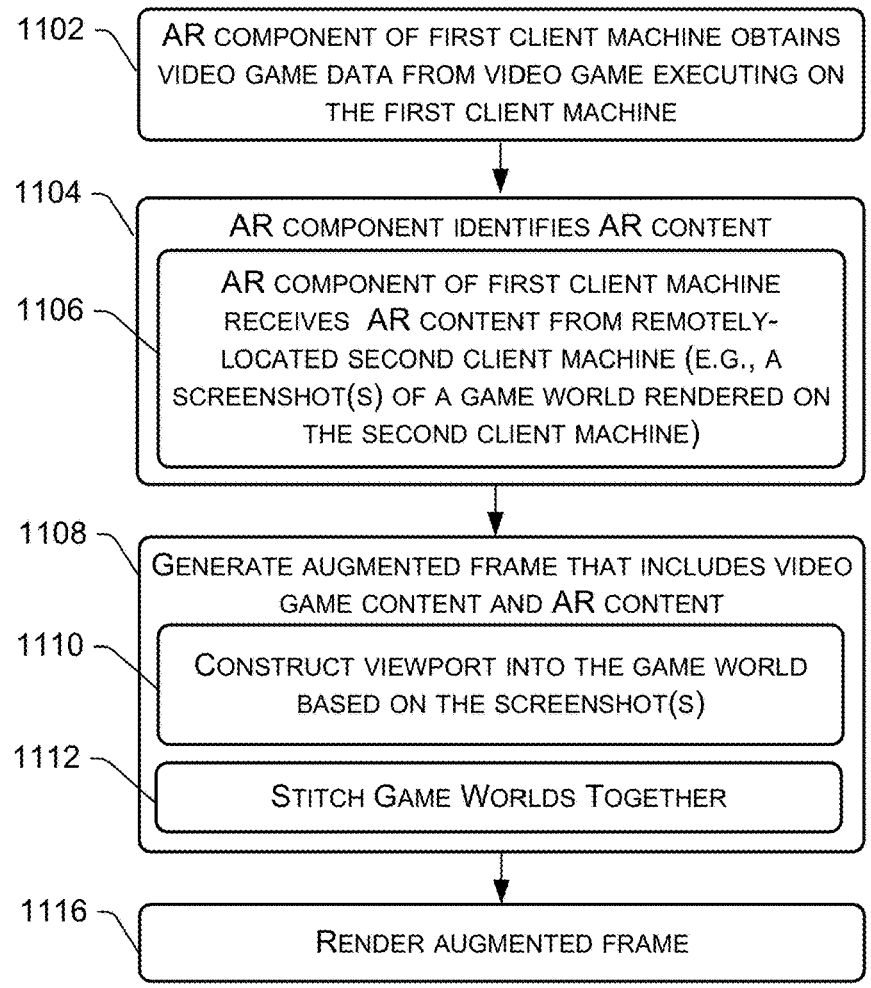
FIG. 11 is a flow diagram of an example process for using an AR system to share aspects of game worlds between client machines.

To illustrate the operation of the techniques described with reference to FIG. 10, reference is now made to FIG. 11, which is a flow diagram of an example process 1100 for using an AR system to share aspects of game worlds between client machines.

At 1102, an AR component 102—executing via the video game client 116 on a first client machine 100(1)—may obtain video game data 128 from a video game 104 executing on the first client machine 100(1), as described herein.

At 1104, the AR component 102 of the first client machine 100(1) identifies AR content 120 to use in generating an augmented frame 122. As shown by sub-block 1106, the AR content 120 can be identified by receiving, over a computer network 218 from a second client machine 100(2), the AR content 120. For example, the AR content 120 may be in the form of a screenshot(s) of a portion of a game world 1002(2) rendered on the second client machine 100(2), which may be the same game world or a different game world as the game world 1002(1) rendered on the first client machine 100(1). In some embodiments, along with the AR content 120, the first client machine 100(1) may receive additional data 800 from the second client machine 100(2), such as spatial data 227 that relates to game world coordinates 226 of the second game world 1002(2) rendered on the second client machine 100(2). This may include the coordinates that correspond to the current location of the second player-controlled character 1026(2) within the second game world 1002(2).

At 1108, the first client machine 100(1), via the AR component 102, may generate an augmented frame 122 that includes the video game content 124 output by the video game 104 and the AR content 120 identified (and received) at block 1104. In some embodiments, the video game data 128 obtained at block 1102 may allow the AR content 120 to be provided in context of the game world 1002(1) that is in the to-be-rendered augmented frame 122, such as by locating the AR content 120 in the form of a screenshot on a wall in the game world 1002(1), or otherwise attaching the AR content 120 to an object in the game world 1002(1). As shown by sub-blocks 1110, 1112, and 1114, the generation of the augmented frame 122 can be implemented in various ways.

At sub-block 1110, the AR component 102 of the first client machine 100(1) may construct a viewport into the game world 1002(2) rendered on the second client machine 100(2) based at least in part on the AR content 120 (e.g., the screenshot(s)) received at block 1106. For example, a 3D screenshot can be used to reconstruct a 3D view of the second player's 106(2) game world 1002(2) within a portal rendered as an AR object in the first game world 1002(1). A series of screenshots can be rendered much like a video stream of AR content 120 to provide a live viewport that can be used for spectating the second player's 106(2) gameplay. In some embodiments, the viewport constructed at sub-block 1110 may include other AR content 120 seen by the second player 106(2) of the second client machine 100(2) within the second game world 1002(2).

At sub-block 1112, the AR component 102 of the first client machine 100(1) may stitch the game world 1002(2) rendered on the second client machine 100(2) together with the game world 1002(1) rendered on the first client machine 100(1) based at least in part on game world coordinates 226 received from the second client machine 100(2). For example, the current game world coordinates can be aligned, if both instances of the game world are within a threshold distance from a common location within the game world. In some embodiments, the AR content 120 is in the form of a 3D screenshot of the game world 1002(2), which can be used to obtain a camera pose associated with this 3D screenshot. This camera pose can be used to align and/or orient other AR content 120 (e.g., objects, game characters, etc.) within the game world 1002(1).

At 1116, the first client machine 100(1), via the AR component 102, may render the augmented frame 122 on a display(s) 110 associated with the first client machine 100 (1), and may then proceed to the next frame as part of an iterative process of rendering a series of frames during execution of the video game 104.

Figure 12:
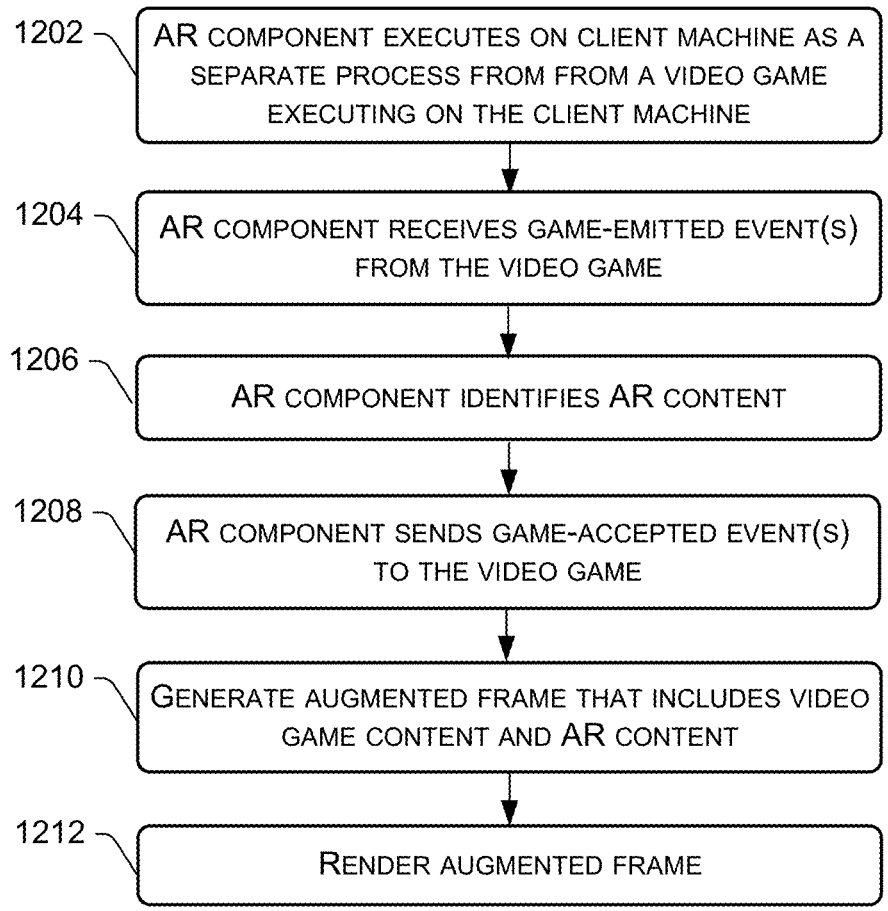
FIG. 12 is a flow diagram of an example process for exchanging events between a video game and a separately executing AR component on a client machine.

FIG. 12 is a flow diagram of an example process 1200 for exchanging events between a video game and a separately executing AR component on a client machine.

At 1202, an AR component 102 may be executed via the video game client 116 on a client machine 100 as a separate process from a video game 104 executing on the client machine 100.

At 1204, the AR component 102 may receive one or more game-emitted events from the video game 104. For example, a game developer may specify game events that the video game will emit during execution, and authors 216 of AR content 120 can subscribe to those "game-emitted events" to learn about what is happening in the video game 104 for purposes of generating AR content 120 and returning game-accepted events to the video game 104.

At 1206, the AR component 102 may identify AR content 120. This identification may be based on providing the game-emitted event(s) as input to an executable program(s) (e.g., a plugin(s)). In some embodiments, the identification may additionally, or alternatively, be based on video game data 128 (e.g., spatial data 227) obtained from the video game 104.

At 1208, the AR component 102 may send one or more game-accepted events to the video game 104 in response to the receiving of the one or more game-emitted events. Again, the game developer may specify events that the video game 104 is capable of accepting. In some embodiments, the executable program(s) (e.g., a plugin(s)) may output these game-accepted events based at least in part on the game-emitted events provided as input.

At 1210, the client machine 100, via the AR component 102, may generate an augmented frame 122 that includes video game content 124 output by the video game 104 and the AR content 120 identified at block 1206.

At 1212, the client machine 100, via the AR component 102, may render the augmented frame 122 on a display(s) 110 associated with the client machine 100, and may then proceed to the next frame as part of an iterative process of rendering a series of frames during execution of the video game 104.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
memory storing computer-executable instructions that, when executed by the one or more processors, cause performance of operations comprising:
  executing a video game that outputs video game content in a series of frames, the video game content representing a game world of the video game;
  identifying augmented reality (AR) content based at least in part on video game data about a current state of the video game;
  generating an augmented frame that includes the AR content rendered within the game world; and
  rendering the augmented frame for display.

2. The system of claim 1, wherein the identifying of the AR content comprises:
providing the video game data as input to one or more executable programs; and
receiving, as output from the one or more executable programs, the AR content.

3. The system of claim 1, wherein the video game data specifies game world coordinates associated with a to-be-rendered portion of the game world, and wherein the AR content is identified based at least in part on the game world coordinates.

4. The system of claim 3, wherein the video game data further specifies a game identifier (ID) of the video game, and wherein the AR content is identified based at least in part on the game ID.

5. The system of claim 1, wherein the video game data specifies a current orientation of a virtual camera associated with a player-controlled character, and wherein the AR content is identified based at least in part on the current orientation of the virtual camera.

6. The system of claim 1, wherein the AR content is a screenshot of at least one of a portion of the game world or a portion of a different game world of a different video game.

7. The system of claim 1, wherein the AR content is a three-dimensional (3D) screenshot, and wherein the generating of the augmented frame comprises:
   constructing a 3D model from the 3D screenshot based at least in part on depth buffer data associated with the 3D screenshot; and
   overlaying the 3D model on at least the portion of the video game content within the augmented frame.

8. The system of claim 1, wherein the AR content is a plurality of sequential three-dimensional (3D) screenshots, and wherein the generating of the augmented frame comprises starting playback of a 3D video based at least in part on the plurality of sequential 3D screenshots.

9. The system of claim 1, the operations further comprising determining the video game data by an AR component executing as a separate process from the video game.

10. A method comprising:
    executing, by one or more processors, a video game;
    identifying, by the one or more processors, augmented reality (AR) content based at least in part on video game data about a current state of the video game;
    generating, by the one or more processors, an augmented frame that includes the AR content rendered within a game world of the video game; and
    rendering, by the one or more processors, the augmented frame for display.

11. The method of claim 10, wherein the identifying of the AR content comprises:
    providing the video game data as input to an executable program; and
    receiving, as output from the executable program, the AR content.

12. The method of claim 10, further comprising determining the video game data by an AR component executing as a separate process from the video game.

13. The method of claim 10, wherein the video game data comprises spatial data associated with a to-be-rendered portion of the game world.

14. The method of claim 13, wherein the spatial data specifies at least one of:
    game world coordinates associated with the to-be-rendered portion of the game world; or
    a current orientation of a virtual camera associated with a player-controlled character.

15. The method of claim 10, wherein the augmented frame is rendered for display on a first client machine, wherein the AR content comprises a screenshot of a portion of the game world, or a different game world, rendered on a second client machine, and wherein the generating of the augmented frame comprises:
    based at least in part on the screenshot, constructing a viewport into the game world, or the different game world, rendered on the second client machine.

16. A method comprising:
    receiving, by one or more processors, video game data associate with a video game;
    identifying, by the one or more processors, augmented reality (AR) content based at least in part on the video game data; and
    sending, by the one or more processors, the AR content to a client machine to generate an augmented frame for the video game that includes the AR content rendered within a game world of the video game.

17. The method of claim 16, wherein the identifying of the AR content comprises:
    providing the video game data as input to one or more executable programs; and
    receiving, as output from the one or more executable programs, the AR content.

18. The method of claim 16, wherein the video game data comprises spatial data associated with a to-be-rendered portion of the game world.

19. The method of claim 16, wherein:
    the identifying of the AR content comprises identifying a subset of available AR content that is associated with a subscribed AR channel; and
    the sending of the AR content to the client machine comprises sending the subset of the AR content to the client machine.

20. The method of claim 19, wherein:
    the identifying of the AR content comprises identifying an additional subset of the available AR content that is associated with an unsubscribed AR channel; and
    the sending of the AR content to the client machine comprises sending the additional subset of the AR content to the client machine for presentation on the client machine in a manner that visually distinguishes the additional subset of the AR content from the subset of the AR content.

* * * * *